US012662027B2

(12) United States Patent
Chen

(10) Patent No.: US 12,662,027 B2
(45) Date of Patent: Jun. 23, 2026

(54) CHILD SAFETY SEAT AND DETACHABLE SIDE IMPACT PROTECTION BLOCK

(71) Applicant: BAMBINO PREZIOSO SWITZERLAND AG, Steinhausen (CH)

(72) Inventor: Yingzhong Chen, Dongguan (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 636 days.

(21) Appl. No.: 18/014,880

(22) PCT Filed: Jun. 16, 2021

(86) PCT No.: PCT/CN2021/100402
§ 371 (c)(1),
(2) Date: Jan. 6, 2023

(87) PCT Pub. No.: WO2022/007605
PCT Pub. Date: Jan. 13, 2022

(65) Prior Publication Data
US 2023/0211709 A1     Jul. 6, 2023

(30) Foreign Application Priority Data

Jul. 6, 2020    (CN) .......................... 202010642342.9

(51) Int. Cl.
*B60N 2/28*          (2006.01)
(52) U.S. Cl.
CPC .................................. *B60N 2/2872* (2013.01)
(58) Field of Classification Search
CPC .................................................. B60N 2/2872
See application file for complete search history.

(56) References Cited

U.S. PATENT DOCUMENTS 7,744,154 B2     6/2010  Marsden et al.
9,610,868 B2     4/2017  Zhang
(Continued)

FOREIGN PATENT DOCUMENTS

CN         102582480 A     7/2012
CN         105329121 A     2/2016
(Continued)

OTHER PUBLICATIONS

Chinese Office Action issued in corresponding Application No. 202010642342.9 dated Dec. 29, 2023.
(Continued)

*Primary Examiner* — Anthony D Barfield
(74) *Attorney, Agent, or Firm* — Volpe Koenig

(57) ABSTRACT

A detachable side impact protection block and a child safety seat provided with same. The detachable side impact protection block comprises a protection block and at least one locking member. The protection block is detachably connected to the child safety seat, and when in a connected state, protrudes from the surface of the connection position; each locking member is arranged between the protection block and the child safety seat, and is used for locking the protection block to the child safety seat, while also allowing for unlocking. The present detachable side impact protection block allows users to selectively install same on the child safety seat according to use requirements, such that child safety seat is adequately safe during use. When not in use, said detachable side impact protection block can be dismounted, such that the child safety seat occupies less lateral space.

22 Claims, 24 Drawing Sheets

1

(56)         References Cited

U.S. PATENT DOCUMENTS

| | | |
|---|---|---|
| 2004/0169406 A1 | 9/2004 | Yoshida |
| 2008/0169697 A1 | 7/2008 | Chen et al. |
| 2010/0019554 A1 | 1/2010 | Mahal et al. |
| 2016/0152164 A1 | 6/2016 | Hass et al. |
| 2016/0176320 A1 | 6/2016 | Williams et al. |

FOREIGN PATENT DOCUMENTS

| | | | |
|---|---|---|---|
| CN | 103879316 | B | 5/2017 |
| CN | 207190853 | U | 4/2018 |
| CN | 207360133 | U | 5/2018 |
| CN | 207449681 | U | 6/2018 |
| CN | 207725265 | U | 8/2018 |
| CN | 208498315 | U | 2/2019 |
| CN | 208585133 | U | 3/2019 |
| CN | 109649228 | A | 4/2019 |
| CN | 208813032 | U | 5/2019 |
| CN | 208827649 | U | 5/2019 |
| CN | 109895664 | A | 6/2019 |
| CN | 209141947 | U | 7/2019 |
| CN | 110126688 | A | 8/2019 |
| CN | 209257923 | U | 8/2019 |
| CN | 110271464 | A | 9/2019 |
| CN | 110641330 | A | 1/2020 |
| CN | 210011644 | U | 2/2020 |
| CN | 110962709 | A | 4/2020 |
| CN | 210416320 | U | 4/2020 |
| DE | 202011104786 | U1 | 1/2012 |
| DE | 102016111608 | A1 * | 12/2017 |
| DE | 102018218458 | A1 | 4/2020 |
| JP | 3017151 | U | 10/1995 |
| JP | 2002240603 | A | 8/2002 |
| JP | 2006123651 | A | 5/2006 |
| JP | 2006151299 | A | 6/2006 |
| JP | 2006151299 | A2 | 6/2006 |
| JP | 2014028305 | A | 2/2014 |
| TW | M273274 | U | 8/2005 |
| TW | M275119 | U | 9/2005 |

OTHER PUBLICATIONS

Japanese Office Action issued in corresponding Application No. 2023-500371 dated Nov. 21, 2023.
Search Report issued in corresponding International Patent Application No. PCT/CN2021/100402 on Sep. 17, 2021, consisting of 8 pp. (English Translation Provided).
Written Opinion issued in corresponding International Patent Application No. PCT/CN2021/100402 on Sep. 17, 2021, consisting of 3 pp.
Office Action issued in corresponding Taiwanese Patent Application No. 110124676 on May 16, 2022, consisting of 24 pp.
Qing, "Suggestions on the use and improvement of car seats in automobile safety" Automotive Technology, China Academic Journal Electronic Publishing House, 2023.
Notice of Allowance issued in corresponding Chinese Application No. 202010642342.9 dated Jun. 26, 2024.
Extended European Search Report issued in corresponding Application No. 21836876.9 dated Jun. 14, 2024.
"First Office Action Issued in Corresponding Taiwan Patent Application No. 113143828", Mailed Date: Mar. 14, 2025, 13 pages.

* cited by examiner

1

100

100

110

310

200

200

200

CHILD SAFETY SEAT AND DETACHABLE SIDE IMPACT PROTECTION BLOCK

CROSS-REFERENCE TO RELATED APPLICATIONS

This application is a 371 U.S. National Phase of International Application No. PCT/CN2021/100402, filed on Jun. 16, 2021, which is based on and claims priority to Chinese Patent Application No. 202010642342.9, filed on Jul. 6, 2020, the entire contents of which constitute a part of this application and are incorporated herein by reference.

TECHNICAL FIELD

The present disclosure relates to the technical field of baby carriers, in particular to a child safety seat and a detachable side impact protection block suitable for the child safety seat.

BACKGROUND

A child safety seat is a device configured to protect a baby in a vehicle seat, and restraints the baby by a restraint device. In the occurrence of emergency braking or accidental collision, an impact force on the baby can be reduced through a housing of the child safety seat, and the movement of the baby's body can be retrained through the restraint device, so that the probability of injury on the baby in the accident can be reduced and the riding safety of the children can be ensured.

Generally, each of side wings of the child safety seat is provided with a side collision protective structure protruded laterally. In the occurrence of side collision of the vehicle, the side wings of the child safety seat and the side collision protective structures thereon perform a buffering function to protect the body and head of the child. However, the side collision protective structures arranged on the side wings occupy much more lateral space, which is inconvenient for the storage of the child safety seat.

Therefore, it is necessary to provide a detachable side impact protection block which can be selectively installed by users according to the requirements.

SUMMARY

The technical solution of the present disclosure is as follows: a detachable side impact protection block is provided, which is detachably installed on the side wing of a child safety seat and includes a protection block and at least one locking member. The protection block is detachably connected to the child safety seat and protrudes from a surface at a connected position in a connected state. Each of the at least one locking member is arranged between the protection block and the child safety seat for locking and unlocking the protection block on the child safety seat.

Correspondingly, the present disclosure also provides a child safety seat, which includes a base, a seat body arranged on the base, two side wings arranged on the seat body, and the detachable side impact protection block as mentioned above, wherein the detachable side impact protection block is detachably connected to the base or/and at least one of the two said side wings.

DETAILED DESCRIPTION

Embodiments of the present disclosure will be described below with reference to the accompanying drawings, in which the same element numbers in different figures represent the same elements.

Figure 1:
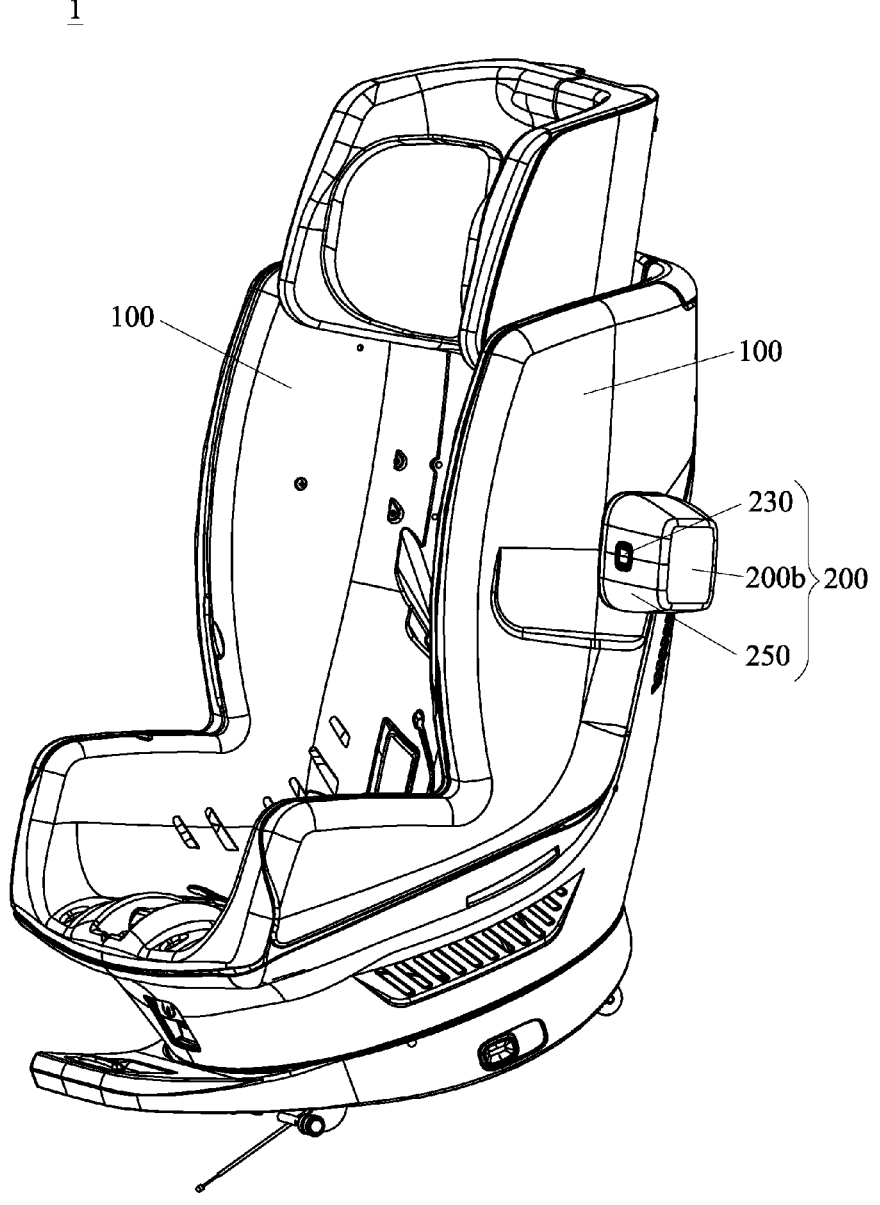
FIG. 1 is a schematic structural view of a child safety seat of the present disclosure.
Figure 2:
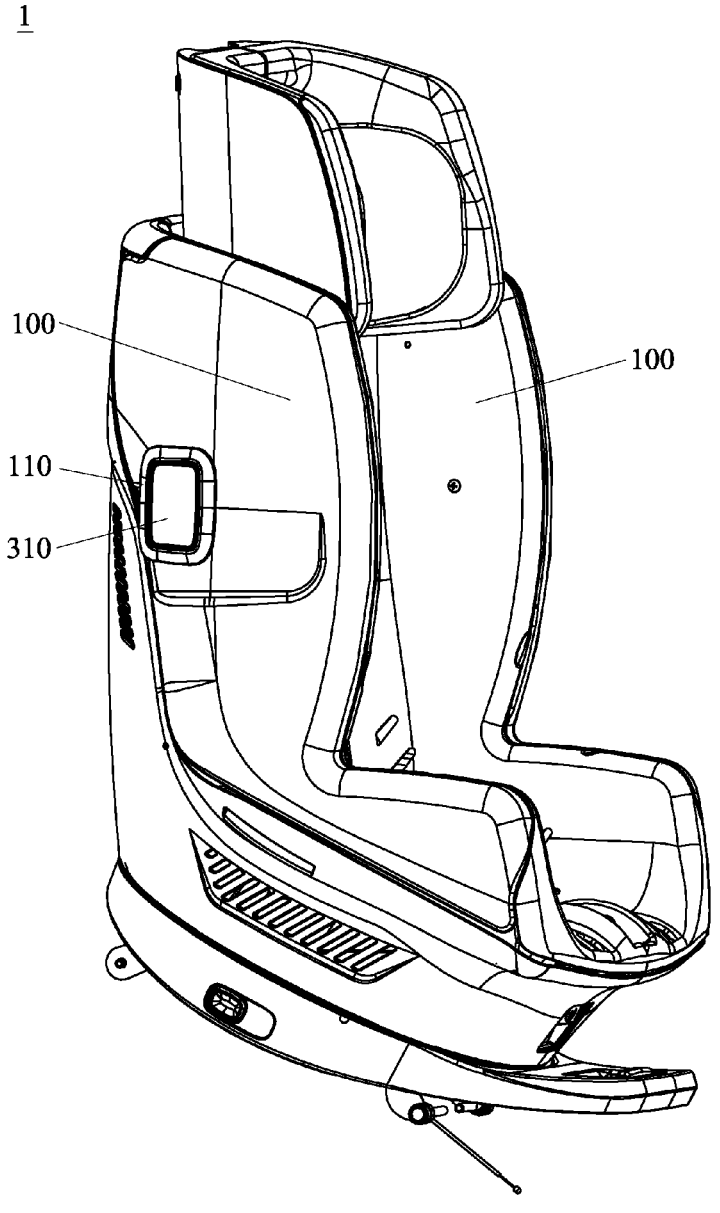
FIG. 2 is a schematic structural view of the detachable side impact protection block in FIG. 1 after it is detached.
Figure 3:
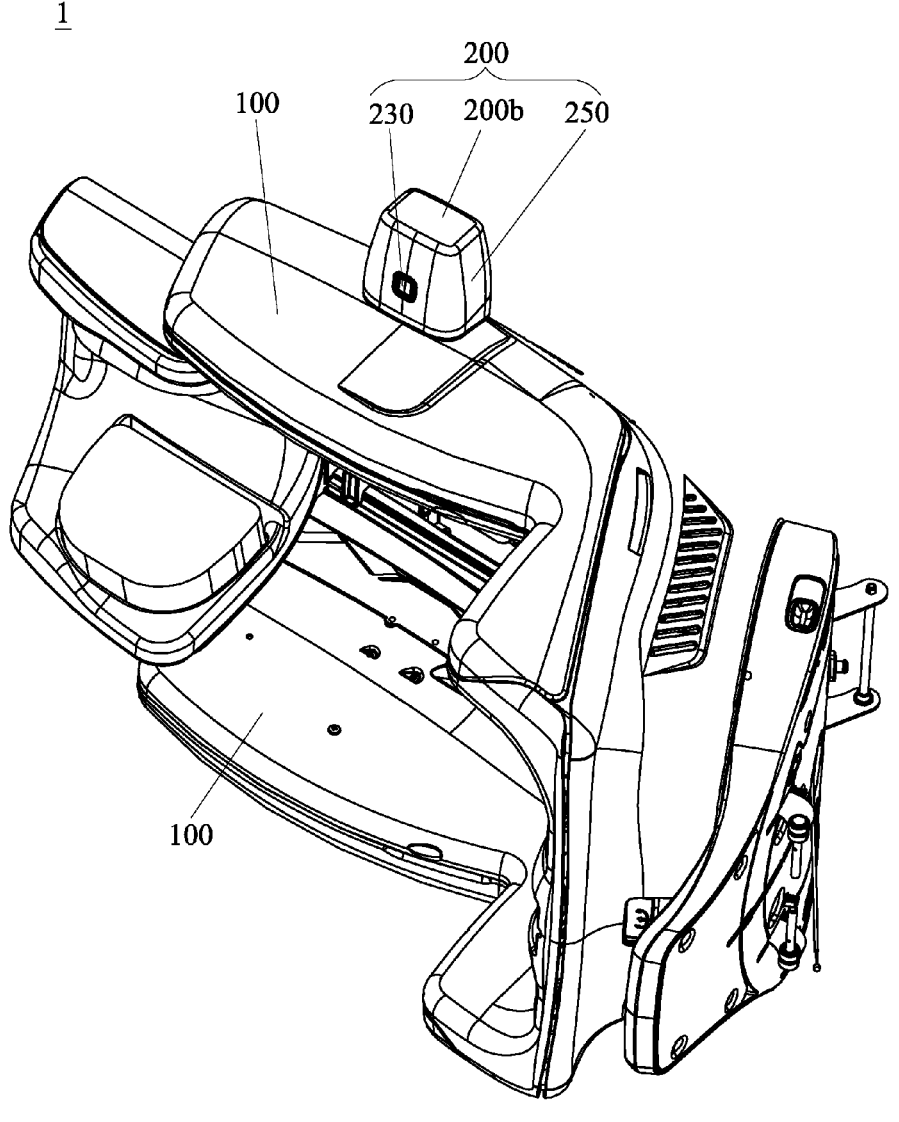
FIG. 3 is a schematic structural view of FIG. 1 from another angle.
Figure 4:
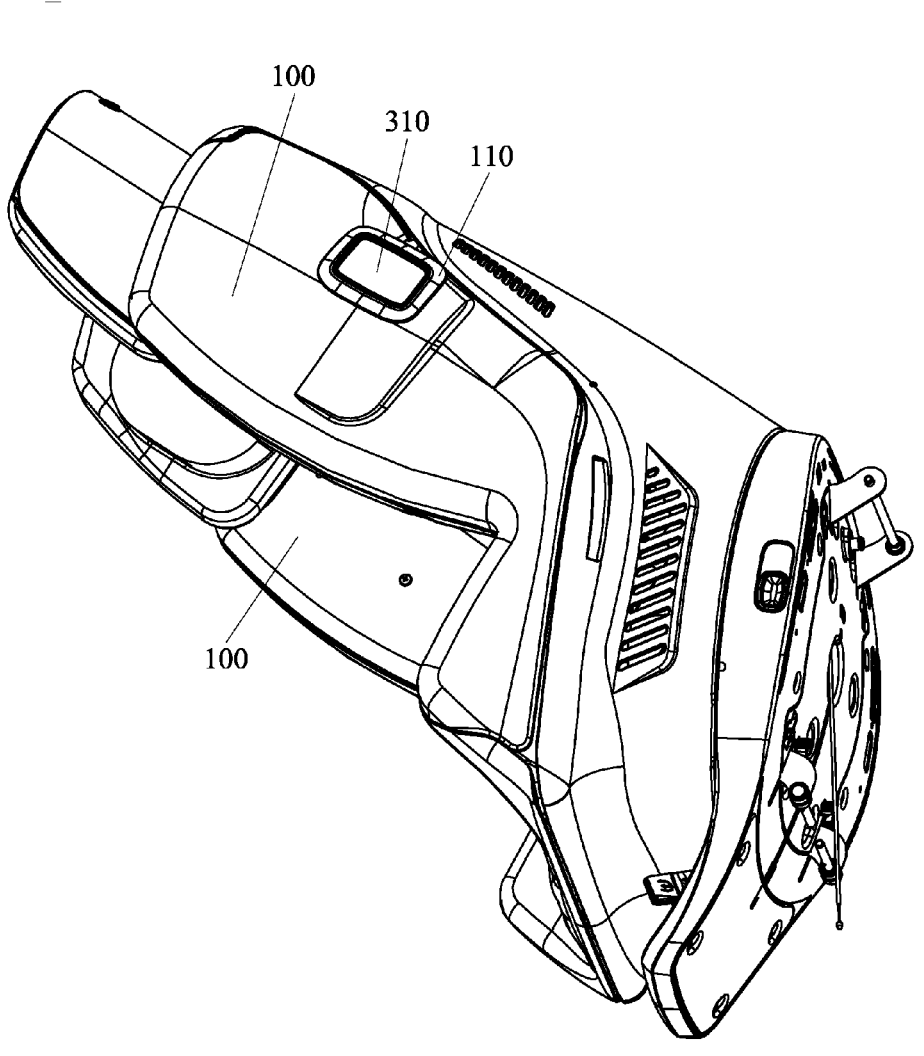
FIG. 4 is a schematic structural view of FIG. 2 from another angle.

First, as shown in FIGS. 1-4, the child safety seat 1 provided by the present disclosure has a seat body (not shown), two side wings 100 oppositely arranged on the seat body, and a detachable side impact protection block 200 detachably installed on one or both of the two side wings 100. When it is necessary, the detachable side impact protection block 200 may be selectively installed on at least one side wing 100, and the installed detachable side impact protection block 200 protrudes from a surface of the side wing 100, as shown in FIGS. 1 and 3. In this way, when a side collision occurs, the detachable side impact protection block 200 may first collide with the vehicle body or other objects to buffer the impact force, thereby providing a better protection. When the detachable side impact protection block 200 is not needed, it may be detached from the side wing 100 to reduce the lateral space as occupied, as shown in FIGS. 2 and 4.

It should be understood that the detachable side impact protection block 200 is not limited to be installed on the side wing 100. The side impact protection block 200 can also be installed at other positions on the child safety seat 1. For example, in one embodiment, the detachable side impact protection block 200 may be optionally installed on a base, on which the seat body is installed.

Referring to FIGS. 4-7 below, in the child safety seat 1 of the present disclosure, a fixing seat 110 is fixed on each of the side wings 100. The fixing seat 110 is fixed on the corresponding side wing 100 by screws or other connectors, a fixing way of which is not limited in the present disclosure. The fixing seat 110 is provided with an accommodating groove 111 with a depth greater than 1 cm. The detachable side impact protection block 200 is detachably connected to (inserted into) the accommodating groove 111 of the fixing seat 110, and protrudes from a surface of the side wing 100 in its connected state.

As shown in FIGS. 8-12, 14 and 17, one end of the detachable side impact protection block 200 forms a connecting end 200a, and the other end thereof forms a force bearing end 200b. In addition, an inner diameter of the accommodating groove 111 of the fixing seat 110 is greater than or equal to an outer diameter of the connecting end 200a, so as to ensure that the connecting end 200a can be detachably connected to the accommodating groove 111, and the force bearing end 200b protrudes from the surface of the side wing 100 in the connected state.

More preferably, the accommodating groove 111 is shaped to correspond to a shape of the connecting end 200a, both of the accommodating groove 111 and the connecting end 200a may be regular geometric shapes or irregular shapes, and the inner diameter of the accommodating groove 111 is slightly greater than the outer diameter of the connecting end 200a, so that shaking of the side impact protection block 200 can be prevented after the connecting end 200a is connected to the accommodating groove 111. In this way, the connection stability and better buffering for the impact force when the detachable side impact protection block 200 is collided are provided.

As shown in FIGS. 4-7, more preferably, a locking hole 112 communicating with the accommodating groove 111 is formed on a side wall of the fixing seat 110, and the connecting end 200a of the detachable side impact protection block 200 may be detachably engaged with the locking hole 112 after being connected to the accommodating groove 111. In addition, locking holes 112 may be respectively formed on opposite side walls of the fixing seat 110, and at least one locking hole 112 may be formed on each of the side walls. This arrangement enables the detachable side impact protection block 200 to be connected to the accommodating groove 111 and then snapped in the at least one locking hole 112. This not only realizes the installation of the detachable side impact protection block 200 on both sides (as described later), but also makes its connection more convenient and stable.

Figure 5:
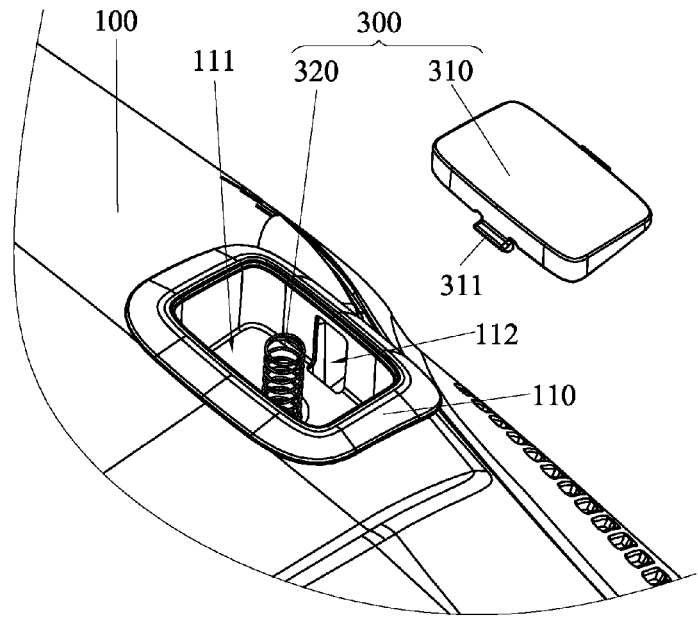
FIG. 5 is a partial exploded view of a cover and a fixing seat in FIG. 4.
Figure 6:
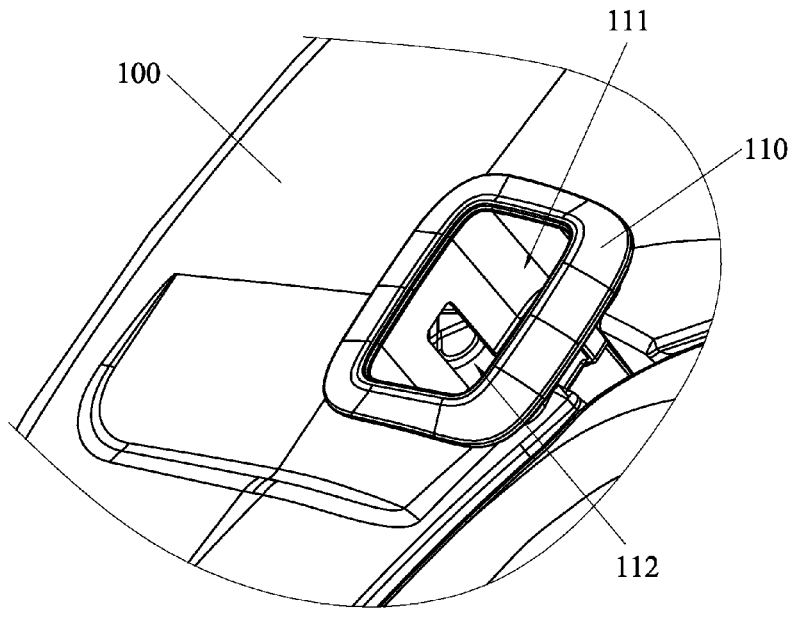
FIG. 6 is a schematic structural view of the fixing seat in FIG. 5 from another angle.
Figure 7:
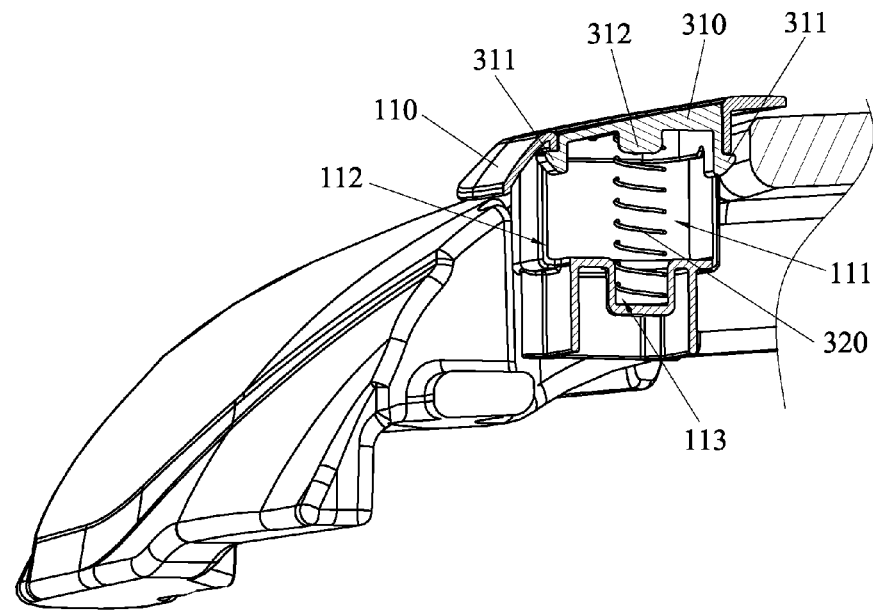
FIG. 7 is a partial sectional view of the cover and the fixing seat in FIG. 4.

As shown in FIGS. 5-7, in one embodiment of the present disclosure, a locking hole 112 is formed on each of side walls of the fixing seat 110 in a widthwise direction. Each of the side walls is provided with one locking hole 112, and the locking holes 112 on both side walls are oppositely arranged, so that the detachable side impact protection block 200 can be selectively snapped in at least one locking hole 112.

It should be noted that, in different embodiments of the present disclosure, the child safety seat 1 may be different, but the side wings 100 and the fixing seat 110 are all arranged in the same way, and the structures of other parts are the conventional arrangements well known to those ordinary skilled in the art, and will not be described in detail.

Referring to FIGS. 1-24 below, the detachable side impact protection block 200 provided by the present disclosure mainly includes a protection block 210 and at least one locking member 220. The protection block 210 is detachably connected to the accommodating groove 111, and the at least one locking member 220 is arranged between the protection block 210 and the fixing seat 110 for locking or unlocking the protection block 210 on the fixing seat 110.

In the preferred embodiment of the present disclosure, the detachable side impact protection block 200 further includes an operating member 230 and a first elastic member 240. Each locking member 220 may be pivotally connected to the protection block 210 and movable between a locked position and an unlocked position, and the locking member 220 is used to be detachably engaged with the locking hole 112. The operating member 230 is connected to the locking member 220 for driving the pivot of the locking member 220 to be changed between the locked position and the unlocked position, and the first elastic member 240 is installed on the protection block 210 and abuts against the locking member 220 or the operating member 230 to reset the locking member 220. When the detachable side impact protection block 200 is installed on the side wing 100, the protection block 210 is connected to the accommodating groove 111 of the fixing seat 110, the locking member 220 is snapped in the locking hole 112 under the action of the first elastic member 240 to be positioned, and the other end of the protection block 210 protrudes from the surface of the side wing 100 and serves as a force bearing end during collision; and when the operating member 230 drives the locking member 220 to resist an acting force of the first elastic member 240, the locking member 220 can be disengaged from the locking hole 112, so that the protection block 210 can be detached from the fixing seat 110, and then the entire detachable side impact protection block 200 can be detached.

More specifically, each locking member 220 has at least one locking hook 221, and the locking hook 221 has a first position and a second position opposite to each other. When the locking hook 221 is at the first position, it may protrude out of the protection block 210, and at this time, the locking hook 221 may be snapped in the aforementioned locking hole 112; and when the locking hook 221 moves to the second position, it may be received into the protection block 210, and at this time, the protection block 210 may be movable relative to the fixing seat 110, so that the protection block 210 is connected to the accommodating groove 111 or detached from the fixing seat 110. In addition, the first elastic member 240 permits the locking hook 221 to have a tendency of 221 moving to the first position.

As shown in FIGS. 5-24, the detachable side impact protection block 200 of the present disclosure further includes an outer housing 250, which may cover the protection block 210 and expose the operating member 230 and the locking hook 221 from the outer housing 250. The outer housing 250 can allow the detachable side impact protection block 200 to have a simple and beautiful appearance, and ensure the overall beauty of the child safety seat 1 in use.

In different embodiments of the present disclosure, the structure of the detachable side impact protection block 200 is slightly different. The different details of the detachable side impact protection block 200 in different embodiments will be explained with reference to FIGS. 7-24 below.

Figure 8:
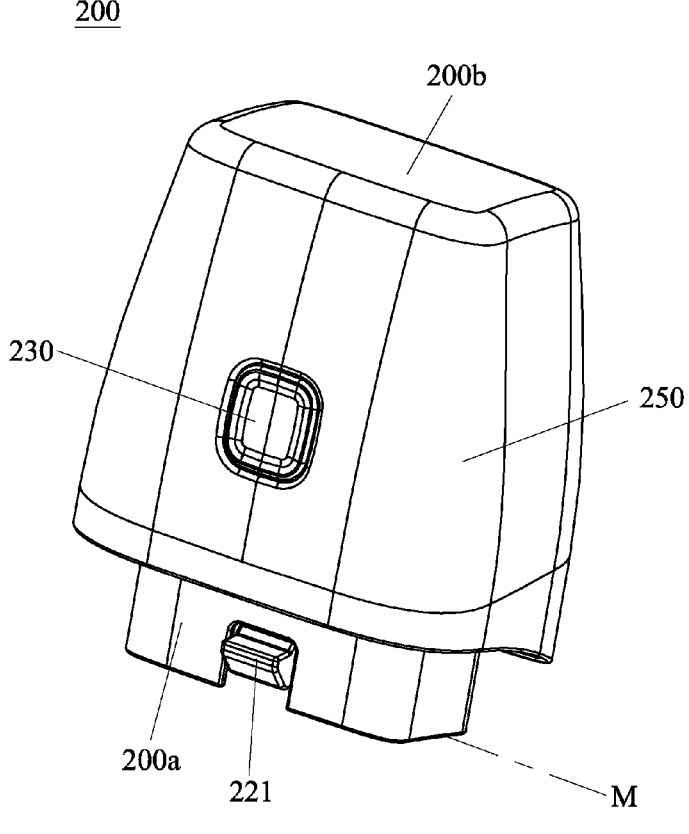
FIG. 8 is a schematic structural view of a detachable side impact protection block according to a first embodiment of the present disclosure.
Figure 9:
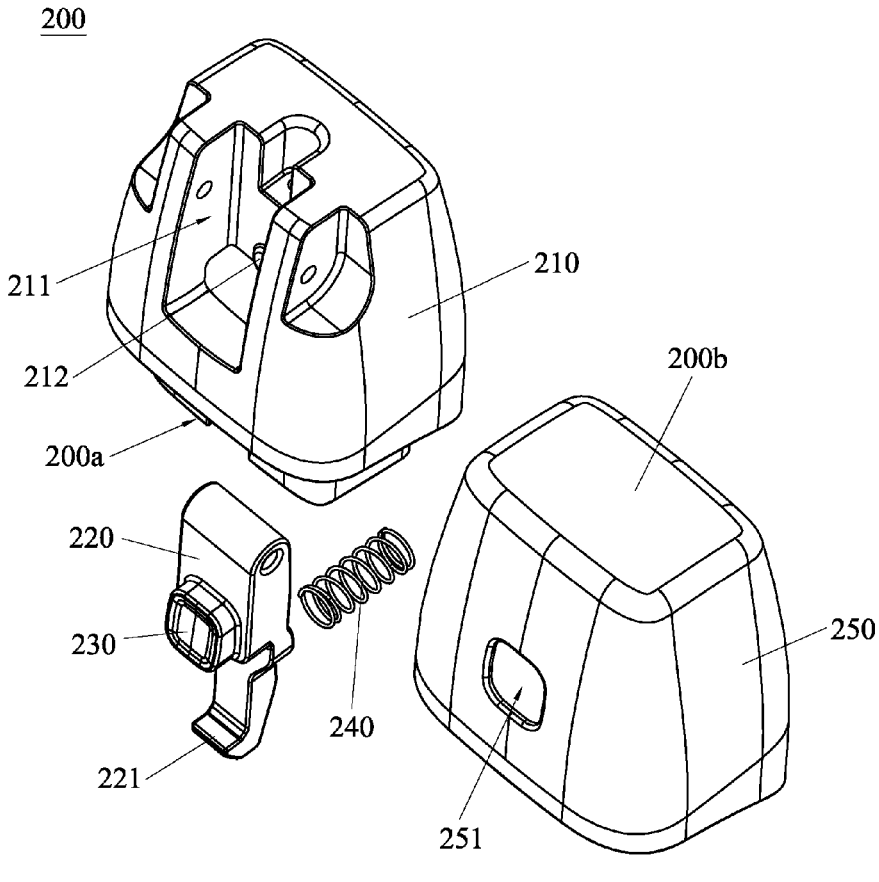
FIG. 9 is an exploded view of FIG. 8.
Figure 10:
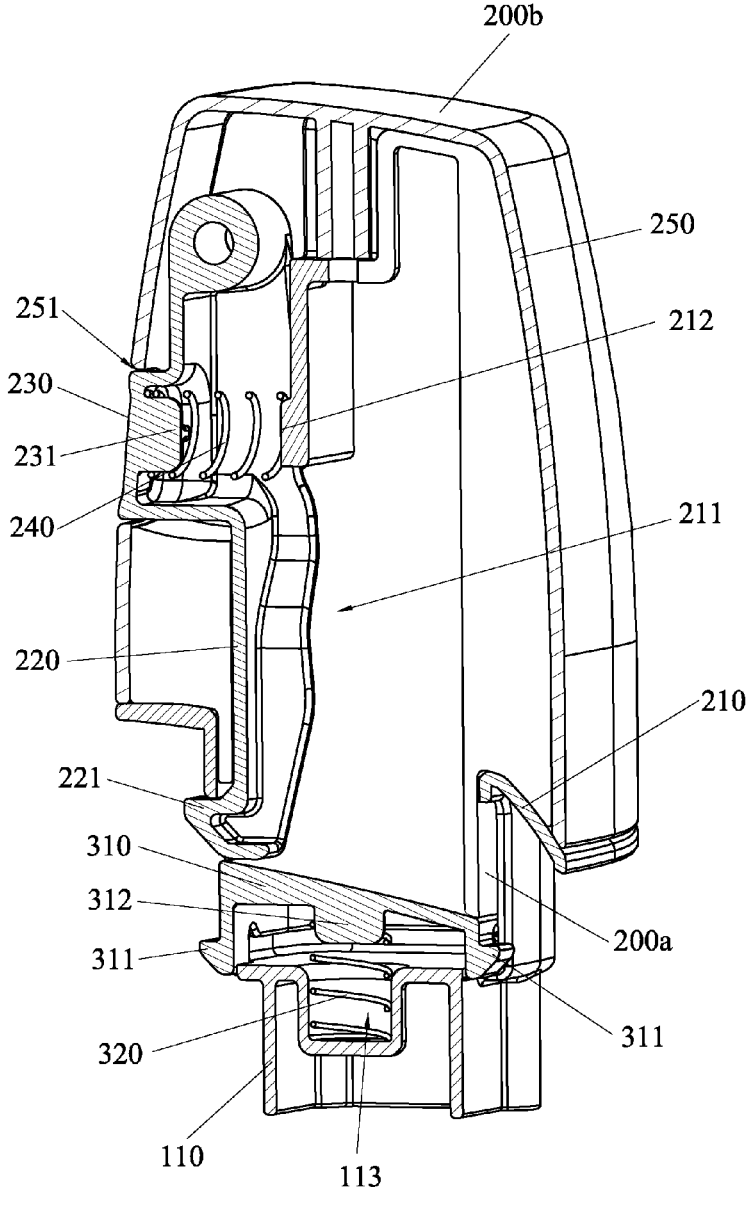
FIG. 10 is a sectional view of the detachable side impact protection block and a shielding assembly in FIG. 8.
Figure 11:
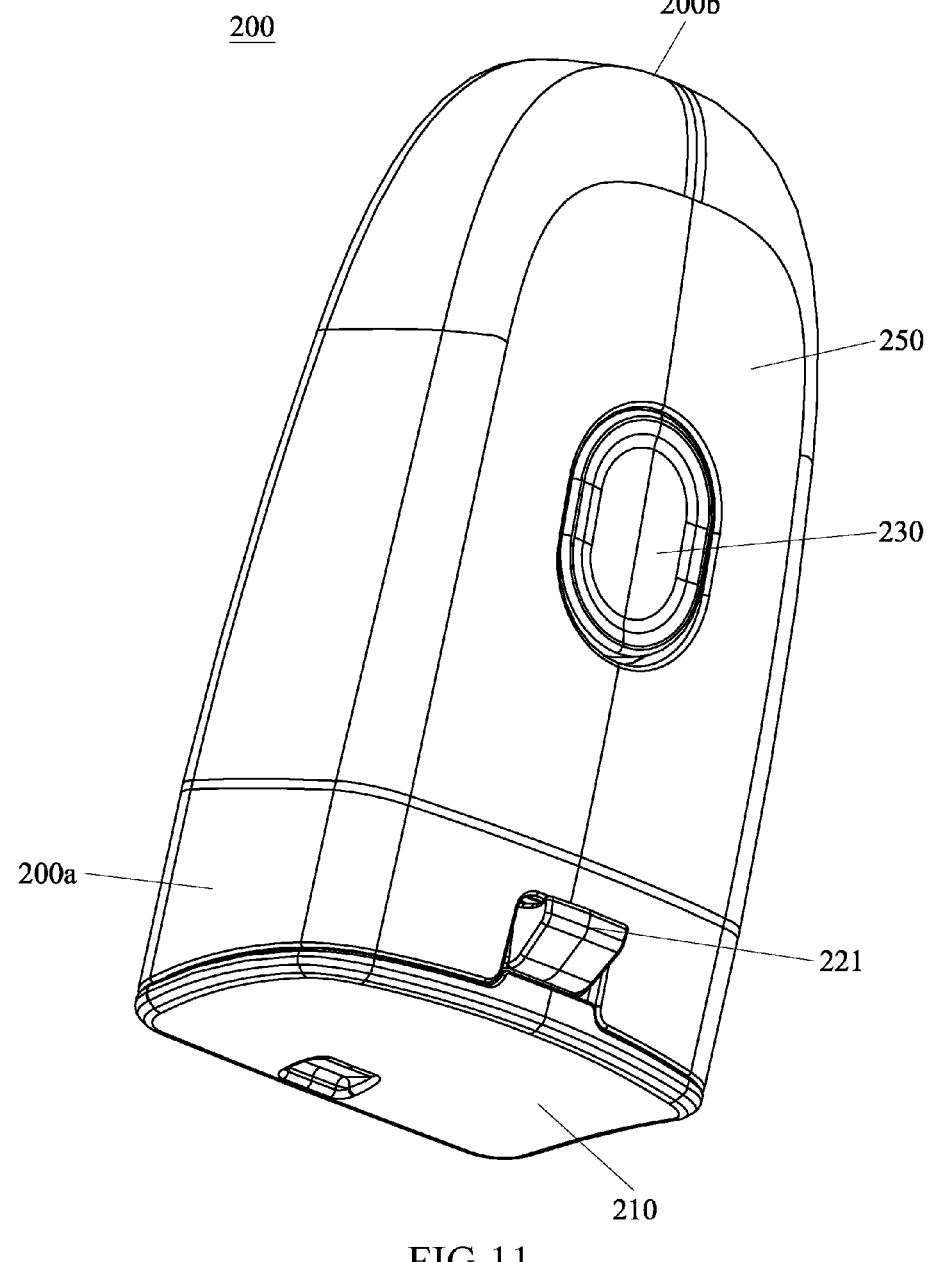
FIG. 11 is a schematic structural view of a detachable side impact protection block according to a second embodiment of the present disclosure.
Figure 12:
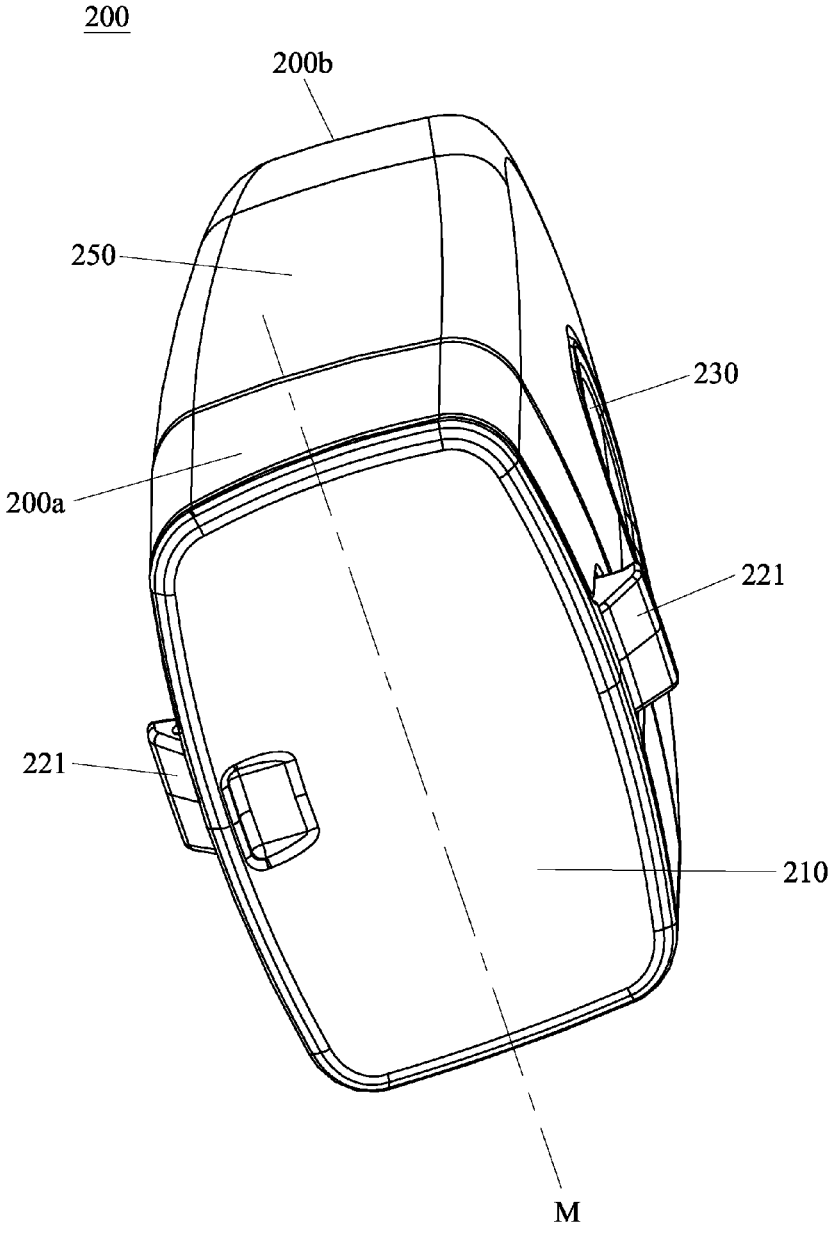
FIG. 12 is a schematic structural view of FIG. 11 from another angle.

First referring to FIGS. 8-10, in a first embodiment of the present disclosure, the detachable side impact protection block 200 has a locking member 220 and a locking hook 221, and a lower end of the protection block 210 forms the connecting end 200a, but it is not limited thereto. One end of the locking member 220 is pivotally connected to the protection block 210, and the locking hook 221 protrudes from the other end of the locking member 220 and is positioned at the connecting end 200a of the protection block 210. The operating member 230 is coaxially pivoted with the locking member 220 and connected to the locking member 220. The operating member 230 protrudes out of the protection block 210 and the outer housing 250. When the operating member 230 is forced to move, it may drive the locking member 220 to pivot, so that the locking hook 221 is movable between the first position and the second position. In addition, at least one of the protection block 210, the locking member 220 and the operating member 230 is provided with a positioning structure, and one end of the first elastic member 240 is installed on and abuts against the positioning structure to ensure the installing stability of the first elastic member 240.

More specifically, the operating member 230 is fixed to the approximate middle section of the locking member 220 and protrudes out of the protection block 210 and the outer housing 250, so that the operating member 230 directly drives the locking member 220 to pivot when it is forced. More preferably, the operating member 230, the locking hook 221 and the locking member 220 are integrally formed, but it is not limited thereto, and the operating member 230 and the locking hook 221 may be separately formed and then fixed to the locking member 220.

As shown in FIGS. 9-10, the protection block 210 is provided with an installing groove 211, the locking member 220 is accommodated within the installing groove 211, and an upper end of the locking member 220 is pivotally connected to the protection block 210. Also, the operating member 230 and the protection block 210 are respectively provided with a positioning structure. The positioning structure is preferably a positioning protrusion. Specifically, a side surface of the operating member 230 is provided with a positioning protrusion 231. Another positioning protrusion 212 directly facing the positioning protrusion 231 is arranged on a side wall of the installing groove 211, and two ends of the first elastic member 240 are sleeved on the two positioning protrusions 231 and 212 respectively, and abut against the operating member 230 and the protection block 210 respectively. Therefore, when the operating member 230 is forced to drive the pivot of the locking member 220, the first elastic member 240 may be compressed for deformation, and after the operating member 230 is released, the first elastic member 240 may recover its deformation and drive the operating member 230 to reset the locking member 220.

It should be understood that the locking member 220 is provided with a positioning protrusion, so that an end of the first elastic member 240 abuts against the locking member 220, and the locking member 220 may also be reset. In addition, the positioning structure is not limited to the positioning protrusion, for example, it may also be provided as a positioning groove or other structures.

Referring to FIGS. 5-10 again, in this embodiment, the connecting end 200a of the protection block 210 is symmetrically arranged along a central line M in a widthwise direction, and the locking hook 221 is positioned at the connecting end 200a and protrudes from a side surface of the connecting end 200a in the widthwise direction, as shown in FIG. 8. Correspondingly, a shape of the accommodating groove 111 of the fixing seat 110 corresponds to a shape of the connecting end 200a, an inner diameter of the accommodating groove 111 is slightly greater than an outer diameter of the connecting end 200a, and each of two side walls of the fixing seat 110 in the widthwise direction is provided with a locking hole 112. In this way, by connecting the locking hook 221 to any of the locking holes 112, the protection block 210 may be connected to the accommodating groove 111 and the locking hook 221 may be engaged with the locking hole 112, so that the protection block 210 can be installed in a way of a front side or a back side thereof, and thus it is more convenient for the installation of the detachable side impact protection block 200.

It should be understood that the detachable side impact protection block 200 in this embodiment may also be provided with two or more locking members 220. For example, two locking members 220 are pivotally connected to the protection block 210, and the locking hooks 221 of the two locking members 220 are respectively provided on the two side surfaces of the connecting end 200a in the widthwise direction, as such, the protection block 210 can also be installed by the way of the front side or the back side thereof, and both side surfaces of the protection block 210 are snapped to the fixing seat 110 after installation, providing more stable connection. It should be understood that, when a plurality of locking members 220 are provided, the locking members 220 are distributed on both sides of the central line M and the locking hooks 221 are respectively positioned on both side surfaces of the connecting end 200a in the widthwise direction, as long as the number of locking holes 112 on the fixing seat 110 corresponds to that of the locking hooks 221.

As shown in FIGS. 8-10, a first through hole 251 is formed on the outer housing 250 at a position corresponding to the operating member 230. After the outer housing 250 covers the protection block 210, the operating member 230 is exposed out of the outer housing 250 through the first through hole 251. In addition, in this embodiment, a bottom edge of the outer housing 250 is positioned above the locking hook 221 after being sleeved on the protection block 210, that is, the connecting end 200a protrudes out of the outer housing 250, so that the bottom edge of the outer housing 250 just abuts against an outer edge of the fixing seat 110 after the connecting end 200a is connected to the accommodating groove 111, as shown in FIG. 3, the aesthetic connection can be ensured. The top end of the housing 250 forms a force bearing end 200b. Of course, the protection block 210 may also be completely accommodated in the outer housing 250. At this time, the bottom end of the outer housing 250 forms the connecting end 200a to be connected to the accommodating groove 111, and a second through hole is formed on the outer housing 250 at a position corresponding to the locking hook 221, so that the locking hook 221 movably protrudes out of the outer housing 250 through the second through hole to be engaged with the fixing seat 110.

In conjunction with FIGS. 2-10 again, the child safety seat 1 of the present disclosure further includes a pop-up shielding assembly 300. As shown in FIGS. 2, 4 and 6, the pop-up shielding assembly 300 is installed within and can be protruded from and retracted into the accommodating groove 111 to shield the accommodating groove 111 when the protection block 210 is detached, so as to maintain uniformity and aesthetics of the overall appearance of the side wing 100.

As shown in FIGS. 5-7, the shielding assembly 300 includes a cover 310 and a second elastic member 320. A shape of the cover 310 is the same as the shape of the accommodating groove 111, and a size of the cover 310 is slightly smaller than an inner diameter of the accommodating groove 111. The cover 310 is slidably installed in the accommodating groove 111, and the second elastic member 320 abuts against the bottom wall of the accommodating groove 111 and the cover 310. When the protection block 210 is installed in the accommodating groove 111, the cover 310 is pressed into the bottom of the accommodating groove 111. When the protection block 210 is detached, the cover 310 moves to the top of the accommodating groove 111 under the action of the second elastic member 320 to shield the accommodating groove 111.

More specifically, a side of the cover 310 is provided with a snapping hook 311, and the cover 310 is slidably engaged with the fixing seat 110 through the snapping hook 311. In this embodiment, a side of the cover 310 corresponding to the locking hole 112 is provided with a snapping hook 311, and the snapping hook 311 of the cover 310 is slidably engaged in the locking hole 112 to realize sliding connection, thus simplifying the structure of the fixing seat 110. When the protection block 210 is installed in the accommodating groove 111, it may push the cover 310 to slide towards the bottom of the accommodating groove 111. In this process, the second elastic member 320 is compressed to deform and generate an elastic force. After the locking hook 221 is snapped in the locking hole 112, the elastic force of the second elastic member 320 may always push the cover 310 and the protection block 210 upwards, so that the protection block 210 is stably snapped in the locking hole 112.

As shown in FIG. 7, a bottom wall of the accommodating groove 111 is concavely provided with a positioning groove 113, and correspondingly, the cover 310 is convexly provided with a positioning protrusion 312. One end of the second elastic member 320 is accommodated in the positioning groove 113, and the other end of the second elastic member 320 is sleeved on the positioning protrusion 312 and abuts against the cover 310. Of course, it is also possible to provide a positioning protrusion on the bottom wall of the accommodating groove 111, or to provide a positioning groove on the cover 310.

With reference to FIGS. 1-10, an installation and disassembly principle of the detachable side impact protection block 200 in this embodiment will be explained.

To install the detachable side impact protection block 200 on a side wing 100 of the child safety seat 1, the operating member 230 is first pressed to drive the pivot of the locking member 220, so that the locking hook 221 moves to the first position and is received into the protection block 210. In this process, the first elastic member 240 is compressed. Then, align the locking hook 221 on the protection block 210 to the locking hole 112 of the accommodating groove 111. After the operating member 230 is released, the locking member 220 is pivoted and reset under the action of the first elastic member 240, so that the locking hook 221 is snapped in the locking hole 112. After that, the installation is completed. At this time, the force bearing end 200b of the detachable side impact protection block 200 protrudes from the surface of the side wing 100, as shown in FIGS. 1 and 3. In the above manner, the detachable side impact protection block 200 is installed on at least one side wing 100 of the child safety seat 1 as desired.

In the process of connecting the detachable side impact protection block 200 to the fixing seat 110, it pushes the cover 310 to slide towards the bottom of the fixing seat 110. After the protection block 210 is snapped in the locking hole 112, the cover 310 is pressed against the bottom of the fixing seat 110. Meanwhile, an elastic force generated by compression of the second elastic member 320 always pushes the cover 310 upwards, so that the protection block 210 is stably snapped in the locking hole 112.

When it is required to detach the detachable side impact protection block 200 from the side wing 100 of the child safety seat 1, the operating member 230 is first pressed to drive the pivot of the locking member 220, so that the locking hook 221 is disengaged from the locking hole 112 and the locking hook 221 moves to the second position. At this time, the detachable side impact protection block 200 may be detached from the fixing seat 110. After the protection block 210 is detached, the cover 310 slides upwards under an elastic force of the second elastic member 320 until the snapping hook 311 of the cover 310 abuts against an end wall of the locking hole 112, and the cover 310 shields the accommodating groove 111 of the fixing seat 110 to keep the side wing 100 clean and beautiful, as shown in FIGS. 4 and 6.

The detachable side impact protection block 200 of the present disclosure is not limited to the embodiment with one locking member 220. A preferred embodiment with two locking members 220 will be described below.

As shown in FIGS. 10-13, compared to the first embodiment, the detachable side impact protection block 200 in a second embodiment of the present disclosure has the following differences. The detachable side impact protection block 200 includes two locking members 220, the two locking members 220 are respectively pivotally connected to the installing grooves 211 of the protection block 210, and the locking hooks 221 are positioned on opposite sides of the protection block 210, and the operating member 230 is connected to the two locking members 220 to synchronously drive the two locking members 220 to pivotally unlock, that is, the locking hooks 221 of two locking member 220 are driven to be synchronously movable between the first position and the second position. In addition, in this embodiment, the first locking member 220 and the second locking member 220 are driven by a first elastic member 240 to synchronously move and reset.

For easy description, the two locking members 220 are further described as a first locking member 220a and a second locking member 220b, respectively. One end of the first locking member 220a is pivotally connected to the protection block 210, and the other end of the first locking member 220a is provided with a locking hook 221 protruding from a side surface of the protection block 210 in the widthwise direction. The approximate middle section of the second locking member 220b is pivotally connected to the protection block 210, and one end of the second locking member 220b is provided with a locking hook 221 protruding from the other side surface of the protection block 210 in the widthwise direction. Preferably, the two locking hooks 221 are arranged symmetric to the central line M of the protection block 210 in the widthwise direction. Meanwhile, the operating member 230 is coaxially pivotally connected with the first locking member 220a and protrudes out of the protection block 210. The operating member 230 is connected to the first locking member 220a and the second locking member 220*b*, and when the operating member 230 is forced to move, it may drive the first locking member 220*a* and the second locking member 220*b* to pivot synchronously.

With continued reference to FIGS. 10-13, the operating member 230 is fixed to the approximate middle section of the first locking member 220*a* or integrally formed with the first locking member 220*a*, and the operating member 230 also includes a driving part 232 protruding towards the second locking member 220*b* and pivotally connected to an end of the second locking member 220*b* away from the locking hook 221, so that when the operating member 230 is pressed, it drives the pivot of the first locking member 220*a* and moves the driving part 232. When the driving part 232 moves, it may push the upper end of the second locking member 220*b*, and thus rotates the second locking member 220*b* around its pivot axis, wherein a pivoting direction of the second locking member 220*b* is opposite to a pivoting direction of the first locking member 220*a*, that is, to drive the first locking member 220*a* and the second locking member 220*b* to move toward each other, so that the locking hooks 221 on the first locking member 220*a* and the second locking member 220*b* synchronously move to the second position. After the operating member 230 is released, the first locking member 220*a* and the second locking member 220*b* synchronously move and reset under the action of the first elastic member 240.

In this embodiment, the arrangement of the second locking member 220*b* simplifies its structure. Of course, the second locking member 220*b* may be arranged in the same structure as the first locking member 220*a*, which does not affect the engagement thereof with the fixing seat 110.

With further reference to FIGS. 10-13, in this embodiment, the first locking member 220*a* and the second locking member 220*b* are respectively provided with a positioning protrusion 222. Specifically, the positioning protrusion 222 on the second locking member 220*b* is arranged below its pivoting shaft, and the positioning protrusion 222 on the first locking member 220*a* is directly opposite to that on the second locking member 220*b*. Two ends of the first elastic member 240 are respectively sleeved on the two positioning protrusions 222 and abut against the first locking member 220*a* and the second locking member 220*b*, so that in the process of pivoting the first locking member 220*a* and the second locking member 220*b* to the unlocked positions thereof, they gradually approach and compress the first elastic member 240 to be deformed. After the operating member 230 is released, the first elastic member 240 is recovered to reset the first locking member 220*a* and the second locking member 220*b* synchronously.

It should be understood that, two first elastic members 240 are provided so that they abut against the first locking member 220*a* and the second locking member 220*b*, respectively, and the first locking member 220*a* and the second locking member 220*b* can be reset.

Referring to FIG. 12 again, in this embodiment, a bottom end of the protection block 210 is symmetrically arranged along the central line M thereof in the widthwise direction, and a regular geometric shape is formed on the bottom end of the protection block 210, so that the detachable side impact protection block 200 can be engaged more smoothly by the way of the front and back sides thereof.

Referring to FIGS. 10-13 again, the arrangement of the outer housing 250 in this embodiment is slightly different from that in the first embodiment. Specifically, a bottom edge of the outer housing 250 abuts against a bottom edge of the protection block 210, that is, the protection block 210 is completely received in the outer housing 250, a connecting end 200*a* is formed on the bottom end of the outer housing 250, the shape and size of the bottom end of the outer housing 250 correspond to that of the accommodating groove 111 of the fixing seat 110, and a force bearing end 200*b* is formed on the top end of the outer housing 250. Meanwhile, the housing 250 is provided with a first through hole 251 and a second through hole 252. The operating member 230 is exposed out of the outer housing 250 through the first through hole 251, and the locking hook 221 movably protrudes out of the outer housing 250 through the second through hole 252.

In this embodiment, other parts of the detachable side impact protection block 200 and the structure of the shielding assembly 300 are the same as those in the first embodiment, and thus will not be described again.

Figure 14:
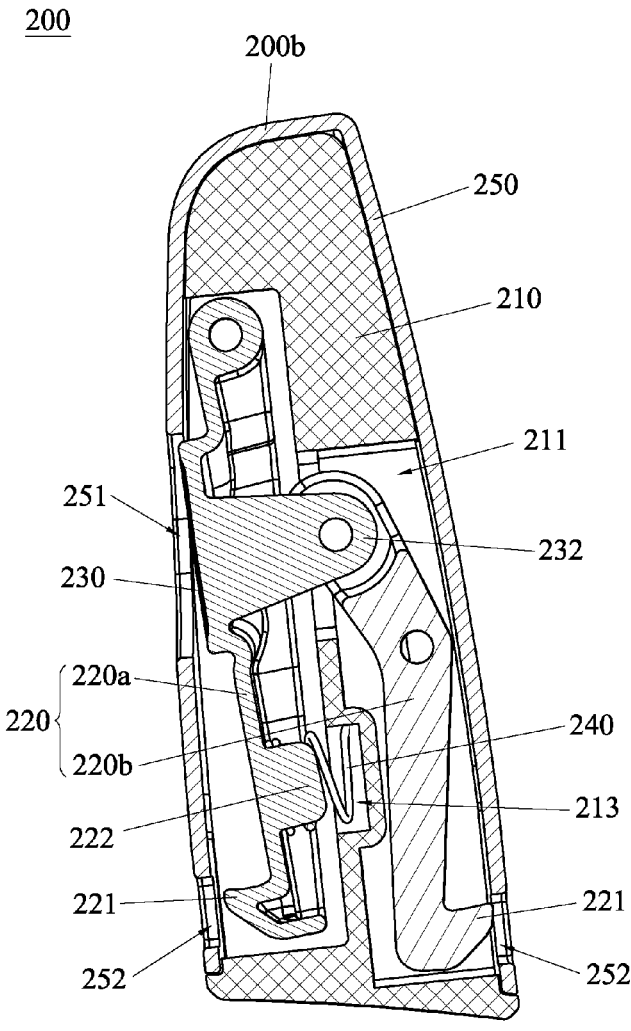
FIG. 14 is a sectional view of a detachable side impact protection block according to a third embodiment of the present disclosure.
Figure 15:
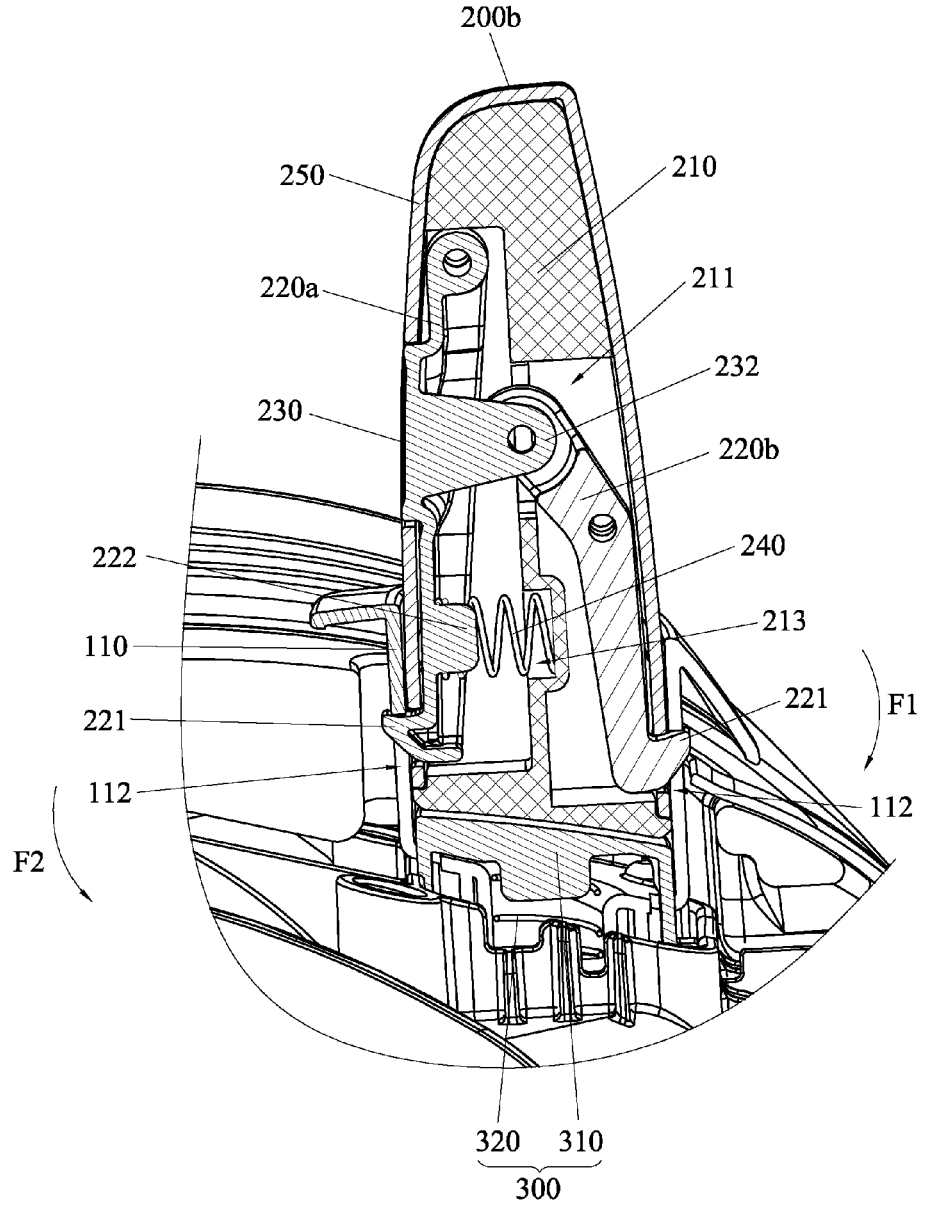
FIG. 15 is a sectional view of the detachable side impact protection block in FIG. 14 installed on the side wing.
Figure 16:
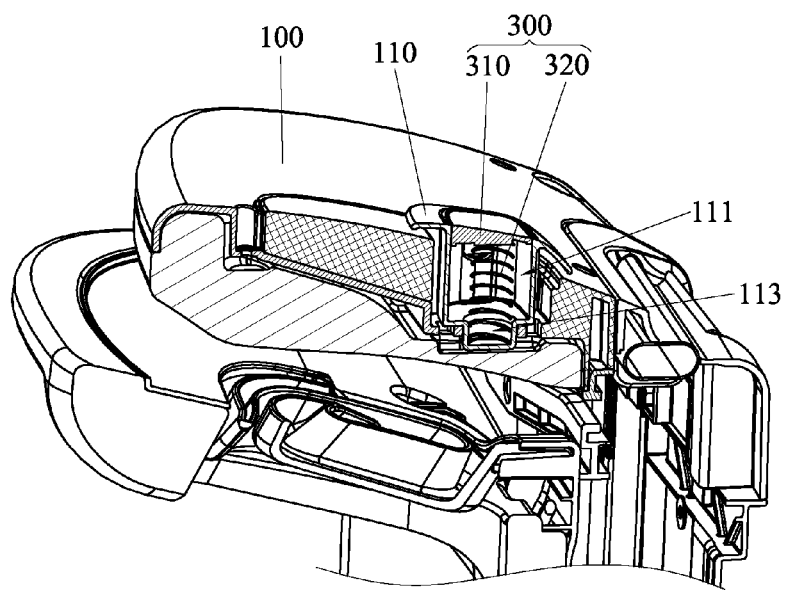
FIG. 16 is a state schematic view in which the detachable side impact protection block of FIG. 15 is detached.
Figure 17:
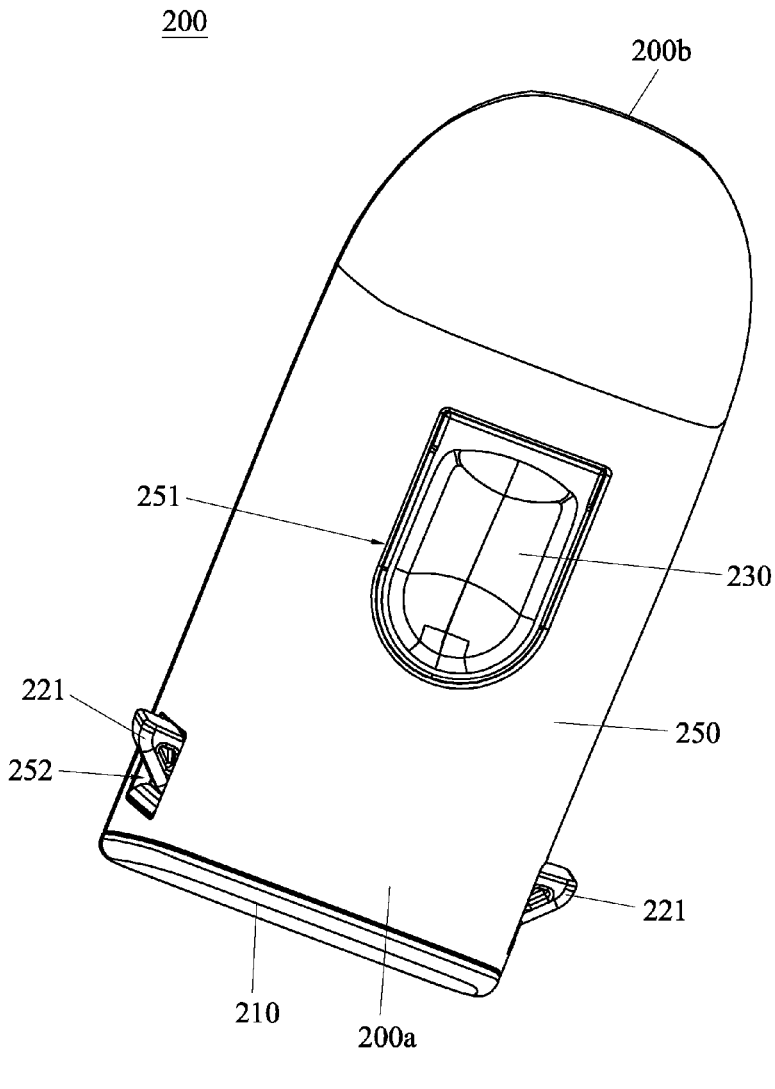
FIG. 17 is a schematic structural view of a detachable side impact protection block according to a fourth embodiment of the present disclosure.

Referring to FIGS. 14-16, the detachable side impact protection block 200 in a third embodiment of the present disclosure differs from that in the second embodiment only in that: a positioning mode of the first elastic member 240 is slightly different. In this embodiment, the first locking member 220*a* is provided with a positioning protrusion 222, and the protection block 210 is provided with a positioning groove 213 corresponding to the positioning protrusion 222, and one end of the first elastic member 240 is sleeved on the positioning protrusion 222 and abuts against the first locking member 220*a*, and the other end thereof is accommodated in the positioning groove 213 and abuts against the protection block 210. Thus, when the operating member 230 drives the first locking member 220*a* to pivot, it may press the first elastic member 240, and when the first elastic member 240 recovers its deformation, it may push the first locking member 220*a* to reset, and the driving part 232 may push the second locking member 220 to reset.

Other parts and the structure of the detachable side impact protection block 200 in this embodiment are the same as those in the above-mentioned second embodiment, and thus will not be described again.

With reference to FIGS. 11-16, an installation and disassembly principle of the detachable side impact protection block 200 in the second and third embodiments will be explained below.

Figure 13:
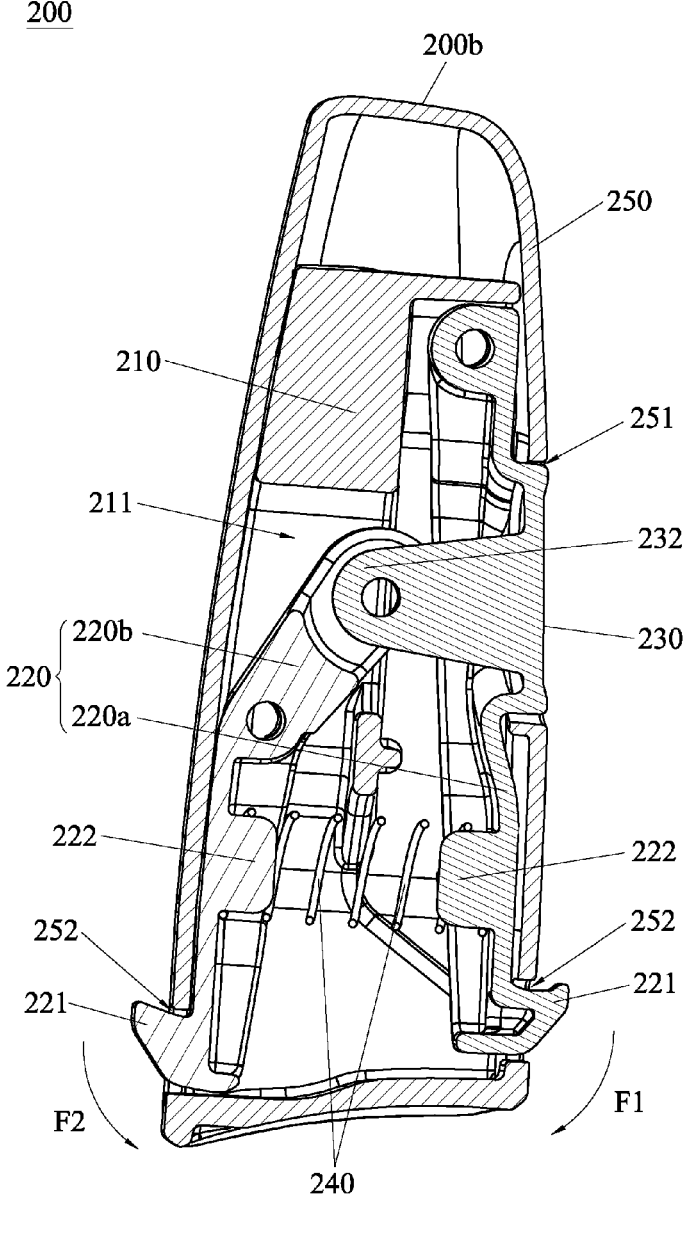
FIG. 13 is a cross-sectional view of FIG. 11.

When the detachable side impact protection block 200 is installed on the side wing 100, the operating member 230 is pressed first to drive the first locking member 220*a* to pivot in a direction as indicated by an arrow F1 in FIG. 13, and the driving part 232 of the operating member 230 moves to push the second locking member 220*b* to pivot in a direction as indicated by an arrow F2 in FIG. 13, that is, pivoting directions of the first locking member 220*a* and the second locking member 220*b* are opposite to each other, so that the locking hooks 221 on these two locking members move to the first position and are received into the outer housing 250. In this process, the first elastic member 240 is compressed. Then, the connecting end 200*a* of the outer housing 250 is connected to the accommodating groove 111. After the operating member 230 is released, the first locking member 220*a* and the second locking member 220*b* are pivoted in opposite directions under the action of the first elastic member 240, so that the locking hooks 221 on these locking members are driven to move to the second position and snapped in the locking holes 112, and the force bearing ends 200*b* protrude from surfaces of the side wings 100, as shown in FIG. 15. In the process of connecting the detachable side impact protection block 200 to the fixing seat 110, the side impact protection block 200 pushes the cover 310 downwards and finally presses the cover 310 against the bottom of the accommodating groove 111, as shown in FIG. 15.

When the detachable side impact protection block 200 is detached, press the operating member 230 to drive the first locking member 220*a* and the second locking member 220*b* to pivot in the directions as indicated by arrows F1 and F2 in FIG. 15 until the locking hooks 221 of both locking members are separated from the locking holes 112. At this time, the detachable side impact protection block 200 may be detached from the fixing seat 110. After the detachable side impact protection block 200 is separated from the fixing seat 110, the cover 310 is reset under the action of the second elastic member 320, so as to shield the accommodating groove 111 of the fixing seat 110, as shown in FIG. 16.

Referring to FIGS. 17-24, in a fourth embodiment of the present disclosure, the detachable side impact protection block 200 also includes two locking members 220, but the connection mode between the operating member 230 and the locking member 220 in this embodiment is different from that in the above-mentioned second and third embodiments.

Referring to FIGS. 17-21, in this embodiment, the two locking members 220 have the same structure and are pivotally connected to the protection block 210 symmetrically. The locking member 220 and the locking hook 221 have a separated structure. Take one of the locking members 220 as an example, the approximate middle section of the locking member 220 is pivotally connected to the protection block 210, the lower end of the locking member 220 is pivotally connected to the locking hook 221, which is slidably connected to the protection block 210, and the upper end of the locking member 220 abuts against the operating member 230. When the operating member 230 moves, the locking member 220 may be driven to pivot to make the locking hook 221 slide between the first position and the second position along the protection block 210.

As shown in FIGS. 17-21, in this embodiment, a driving part 232 and a driven part 223 are cooperated with each other and are arranged between the operating member 230 and the locking member 220, and the driving part 232 and the driven part 223 may interact with each other to push the locking member 220 to pivot when the operating member 230 is forced to move. More specifically, one end of the operating member 230 is connected to the protection block 210, and the other end thereof is provided with a driving part 232 protruding in a direction parallel to an axial direction of the pivoting axis of the locking member 220, and the side surface of the driving part 232 forms a driving surface 2321. Correspondingly, the upper end of the locking member 220 is convexly provided with a driven part 223, the driven part 223 and the locking hook 221 respectively protrude in opposite directions relative to a body of the locking member 220, and the driven part 223 is provided with a driven inclined surface 2231, an extending direction of which is staggered with the protruding direction of the driving part 232. When the operating member 230 is forced to move, its driving part 232 moves along the driven inclined surface 2231, and the driving surface 2321 gradually acts on the driven inclined surface 2231 to push the locking member 220 to pivot.

Figure 20:
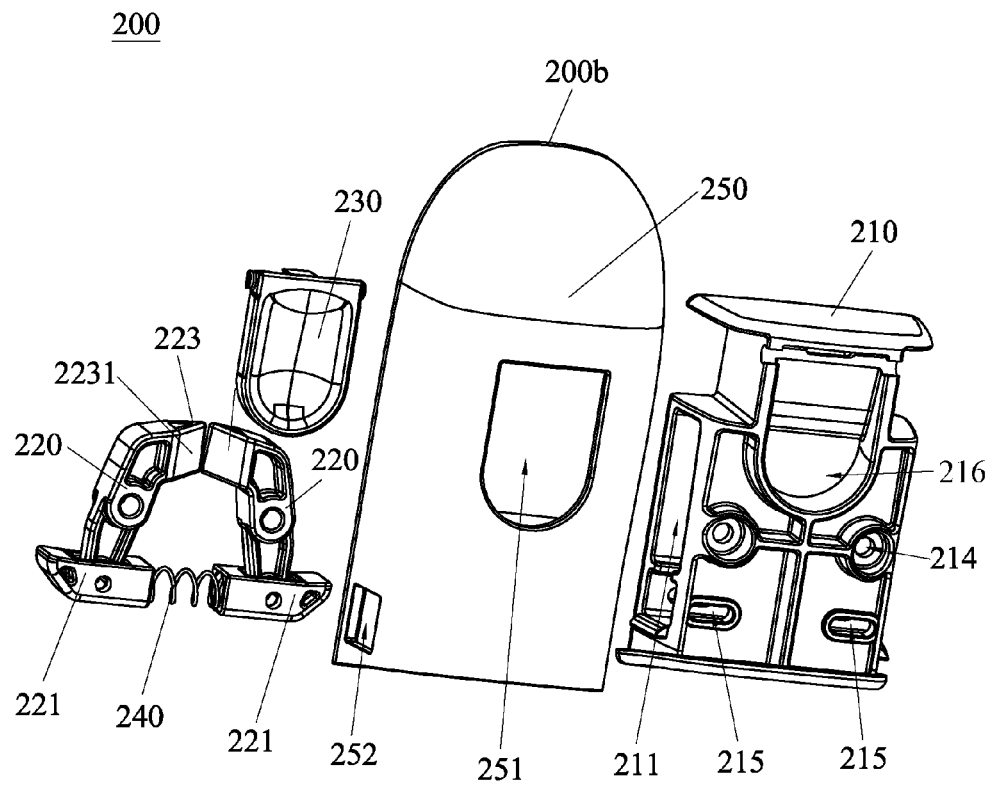
FIG. 20 is a further exploded view of FIG. 19.
Figure 21:
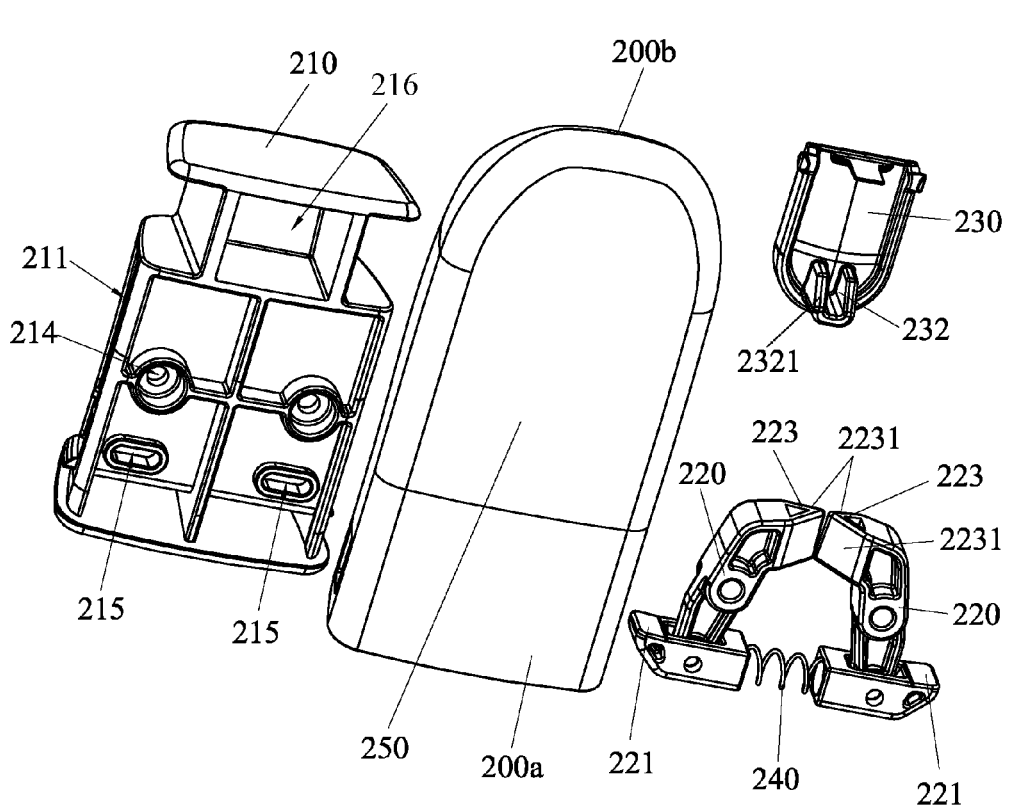
FIG. 21 is a schematic structural view of FIG. 20 from another angle.
Figure 22:
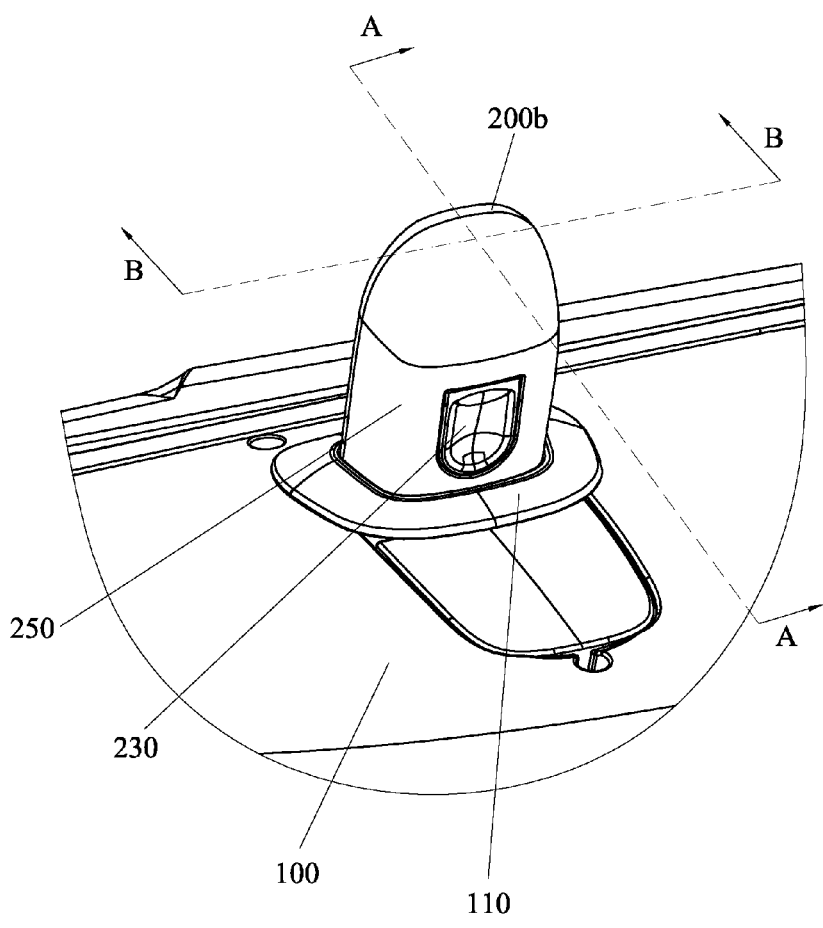
FIG. 22 is a partial structural view of the detachable side impact protection block in FIG. 17 installed on the side wing.

As shown in FIGS. 20-21, in this embodiment, after the two locking members 220 are pivotally connected to the protection block 210, the driven parts 223 thereof are adjacent to each other, and the driven inclined surfaces 2231 of the two driven parts 223 are formed in a roughly V-shape. When the driving surface 2321 acts on the driven inclined surfaces 2231, the two driven parts 22 are pushed to move to both sides of the driving part 232, thereby pushing the pivot of the two locking members 220.

Further referring to FIGS. 17-21, in this embodiment, the protection block 210 is provided with an installing groove 211, a pivoting hole 214, a sliding groove 215 and an installing hole 216 which communicate with the installing groove 211 are provided on the side wall of the protection block 210. The locking member 220 is accommodated in the installing groove 211 and pivotally connected to the pivoting hole 214, and the locking hook 221 is slidably connected to the sliding groove 215 and pivotally connected to a lower end of the locking member 220. The operating member 230 is movably installed in the installing hole 216, and the driving part 232 thereof abuts against the driven inclined surface 2231 of the locking member 220.

In this embodiment, the first elastic member 240 abuts between the two locking hooks 221. Specifically referring to FIG. 18, one end of each of the locking hooks 221 is provided with a positioning groove, and the end of the first elastic member 240 is accommodated in the positioning groove. When the two locking hooks 221 slide towards each other, the first elastic member 240 may be pressed to be deformed, and when the first elastic member 240 is recovered, it can push the two locking hooks 221 to slide in opposite directions until they reach the first position.

It should be understood that, the connection mode between the operating member 230 and the locking member 220 in this embodiment is also applicable to the case where only one locking member 220 is provided.

In addition, the structure of the outer housing 250 in this embodiment is the same as that in the second and third embodiments, and the structure of the shielding assembly 300 is the same as that in the first embodiment, which will not be described again.

Hereinafter, with reference to FIGS. 17-24, an installation and disassembly principle of the detachable side impact protection block 200 in this embodiment will be explained.

Figure 18:
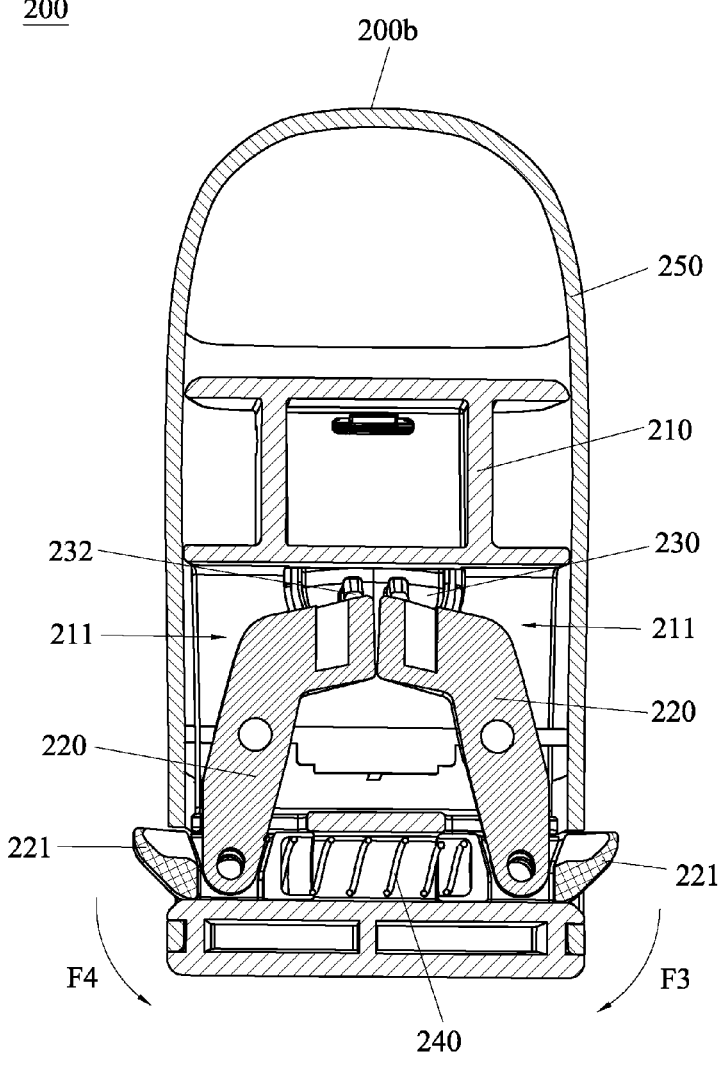
FIG. 18 is a sectional view of FIG. 17.
Figure 19:
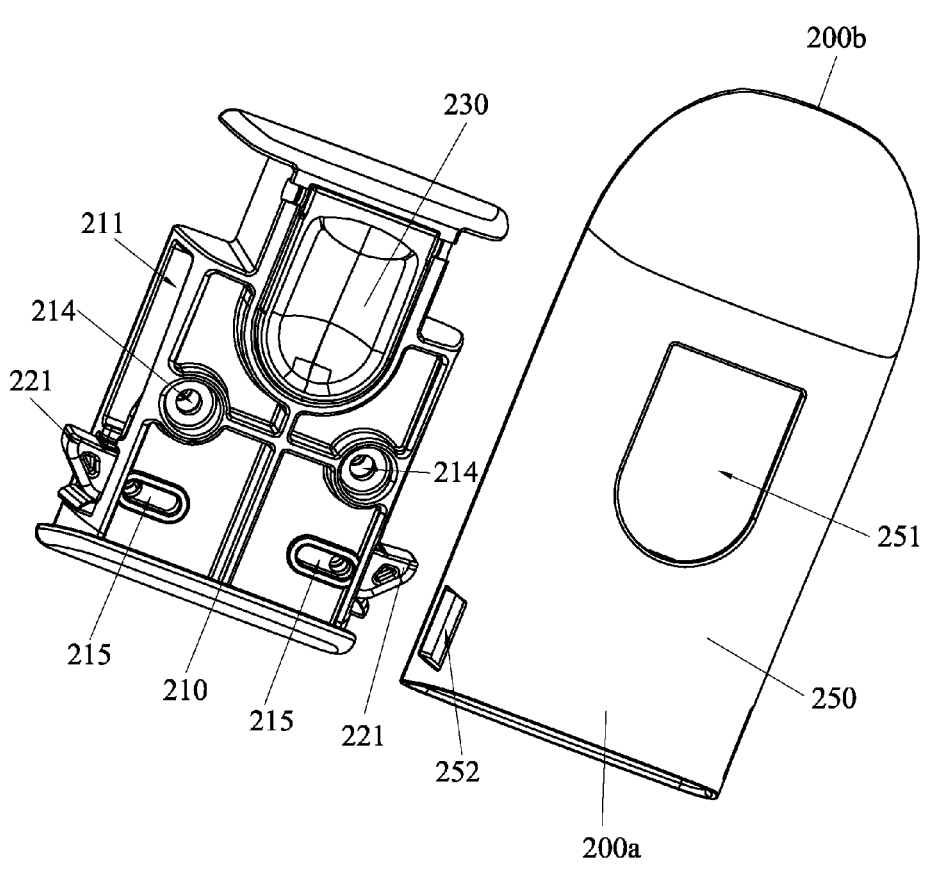
FIG. 19 is an exploded view of FIG. 17.
Figure 23:
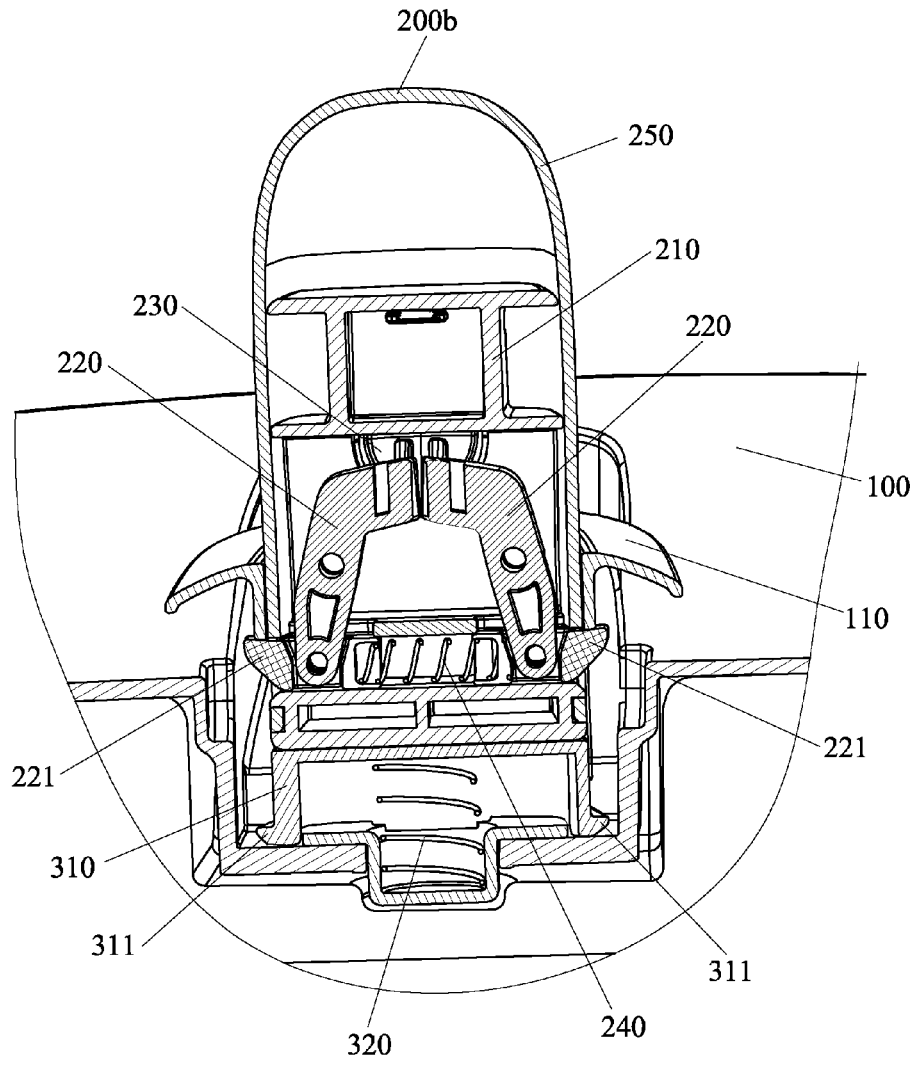
FIG. 23 is a partial sectional view taken along line A-A in FIG. 22.
Figure 24:
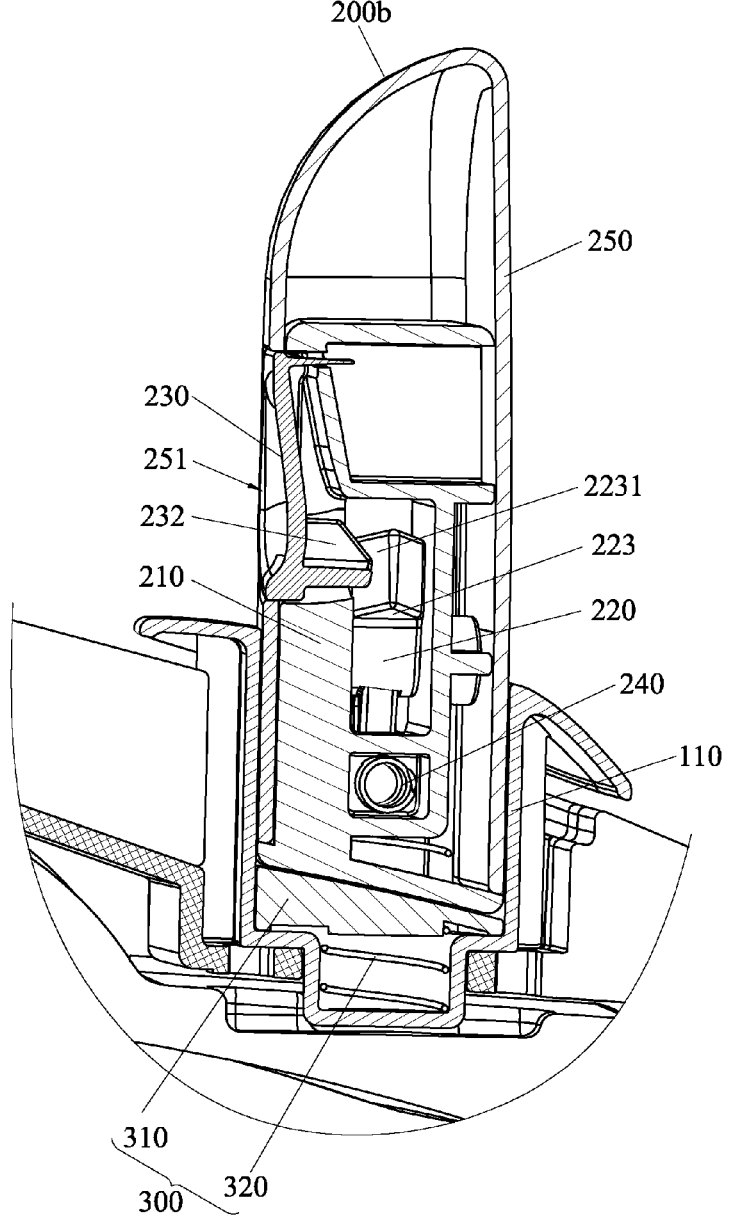
FIG. 24 is a partial sectional view taken along line B-B in FIG. 22.

When the detachable side impact protection block 200 is installed on the side wing 100, press the operating member 230 first to drive the two locking members 220*a* to pivot in the directions as shown by arrows F3 and F4 in FIG. 18, that is, pivoting directions of the two locking members 220 are opposite to each other, and thus the two locking hooks 221 are driven to slide to the first position and be received into the outer housing 250. In this process, the first elastic member 240 is compressed. Then, the connecting end 200*a* of the outer housing 250 is connected to the accommodating groove 111. After the operating member 230 is released, the elastic force of the first elastic member 240 pushes the two locking hooks 221 to slide in opposite directions to the second positions and to be snapped into the locking holes 112, as shown in FIG. 23. After that, the installation is completed. In the process of connecting the detachable side impact protection block 200 to the fixing seat 110, it pushes the cover 310 downwards and finally presses the cover 310 against the bottom of the accommodating groove 111, as shown in FIG. 23.

When it is necessary to detach the detachable side impact protection block 200, press the operating member 230 again to drive the two locking members 220 to pivot until the locking hooks 221 of the two locking members 220 are separated from the locking holes 112. At this time, the detachable side impact protection block 200 may be detached from the fixing seat 110. After the detachable side impact protection block 200 is separated from the fixing seat 110, the cover 310 is reset under the action of the second elastic member 320, thereby shielding the accommodating groove 111 of the fixing seat 110.

It should be understood that the structure of the detachable side impact protection block 200 of the present disclosure is not limited to the arrangement mode in the above preferred embodiments. In other embodiments, the locking member 220 may also be a magnetic member provided in at least one of the protection block 210 and the fixing seat 110. When only one of the protection block 210 and the fixing seat 110 is provided with a magnetic member, the other one thereof is made of a material which can attract the magnetic members magnetically. After the protection block 210 is connected to the accommodating groove 111, it is magnetically attracted to the fixing seat 110. In this way, the installation of the protection block 210 can be realized without providing the locking hole 112 on the fixing seat 110.

Furthermore, the detachable side impact protection block 200 described in the above first to fourth embodiments may be additionally provided with a magnetic member, that is, a magnetic member provided on at least one of the protection block 210 and the fixing seat 110 in the above embodiment can strengthen the connection therebetween by magnetic adsorption.

As mentioned above, the detachable side impact protection block 200 of the present disclosure has a protection block 210 and at least one locking member 220. The protection block 210 is detachably connected to the child safety seat, for example, to the side wing or/and the base of the child safety seat, and protrudes from the surface at a connected position in a connected state. Each of the locking members 220 is arranged between the protection block 210 and the child safety seat to lock and unlock the protection block on the child safety seat. Therefore, the user can selectively install the protection block 210 on the base or/and at least one side wing 100 according to the use requirements, so that the child safety seat 1 has sufficient safety in use, and the detachable side impact protection block 200 may be detached when not in use, so that the child safety seat 1 occupies less lateral space and is more convenient to use or store.

Correspondingly, the child safety seat 1 with the detachable side impact protection block 200 also has the same technical effect.

What has been disclosed above is only the preferred embodiment of the present disclosure, which of course should not be used to limit the scope of the present disclosure. Therefore, equivalent changes made according to the scope of the present disclosure are still covered by the present disclosure.

What is claimed is:

1. A detachable side impact protection block detachably installed on a child safety seat, comprising:

a protection block detachably connected to the child safety seat and protruding from a surface at a connected position in a connected state; and at least one locking member, each of the at least one locking member being arranged between the protection block and the child safety seat for locking and unlocking the protection block on the child safety seat, wherein each of the at least one locking members is connected to the protection block so that each of the at least one locking members is detachable with the protection block;

wherein each of the at least one locking member has at least one locking hook, and each of the at least one locking hook has a first position and a second position opposite to each other, the at least one locking hook protrudes out of the protection block when it is at the first position, and the at least one locking hook is received into the protection block when it is at the second position; and wherein a first elastic member is installed on the protection block and abutting against the at least one locking member or an operating member, the first elastic member permitting the at least one locking hook to present a tendency of moving to the first position.

2. The detachable side impact protection block according to claim 1, wherein each of the at least one locking member is movably connected to the protection block and is movable between a locked position and an unlocked position, and the at least one locking member is configured to be detachably engaged with the child safety seat.

3. The detachable side impact protection block according to claim 2, wherein the operating member is connected to the at least one locking member for driving the at least one locking member to move to the unlocked position so as to be disengaged from the child safety seat.

4. The detachable side impact protection block according to claim 3, wherein the operating member is fixed to the at least one locking member and exposed out of the protection block, and the operating member drives the at least one locking member to move when it is forced.

5. The detachable side impact protection block according to claim 3, wherein a driving surface and a driven inclined surface cooperating with each other are arranged between the operating member and the at least one locking member, and the driving surface and the driven inclined surface interact with each other to push the at least one locking member to pivot when the operating member is forced.

6. The detachable side impact protection block according to claim 5, wherein the operating member is convexly provided with a driving part, a side surface of the driving part forms the driving surface, and the driven inclined surface is arranged at one end of the at least one locking member and abuts against the driving surface.

7. The detachable side impact protection block according to claim 3, further comprising an outer housing covering the protection block and exposing the operating member from the outer housing, the at least one locking member movably protruding out of the outer housing to engage with the child safety seat.

8. The detachable side impact protection block according to claim 1, wherein when the at least one locking hook is at the first position, it is engaged with the child safety seat to connect the protection block to the child safety seat, and when the at least one locking hook is at the second position, the protection block is movable relative to the child safety seat.

9. The detachable side impact protection block according to claim 1, comprising a plurality of said locking members, the locking hooks of the locking members being arranged on opposite sides of the protection block.

10. The detachable side impact protection block according to claim 9, wherein a bottom end of the protection block is symmetrically arranged along a central line in a widthwise direction, and the locking hooks of the locking members are arranged at the bottom end of the protection block and positioned on both sides of the central line.

11. The detachable side impact protection block according to claim 1, wherein the at least one locking member or the operating member is provided with a positioning structure, and one end of the first elastic member is installed on the positioning structure and abuts against the positioning structure.

12. The detachable side impact protection block according to claim 11, wherein the positioning structure is a positioning protrusion or a positioning groove.

13. The detachable side impact protection block according to claim 1, wherein the protection block is provided with an installing groove, the at least one locking member is accommodated in the installing groove and pivotally connected to the protection block, and the at least one locking member drives the at least one locking hook to move between the first position and the second position when pivoting.

14. The detachable side impact protection block according to claim 13, wherein the at least one locking hook is pivotally connected to one end of the at least one locking member and slidably connected to the protection block.

15. The detachable side impact protection block according to claim 13, wherein the at least one locking hook is fixed to one end of the at least one locking member.

16. A detachable side impact protection block detachably installed on a child safety seat, comprising:

a protection block detachably connected to the child safety seat and protruding from a surface at a connected position in a connected state;

at least one locking member, each of the at least one locking member being arranged between the protection block and the child safety seat for locking and unlocking the protection block on the child safety seat, wherein each of the at least one locking member is movably connected to the protection block and is movable between a locked position and an unlocked position, and the at least one locking member is configured to be detachably engaged with the child safety seat; and an operating member fixed to the at least one locking member and exposed out of the protection block, the operating member drives the at least one locking member to move to the unlocked position so as to be disengaged from the child safety seat;

wherein the operating member further comprises a driving part connected to another said locking member, and the operating member drives the locking members to move synchronously between the locking position and the unlocking position when the operating member moves.

17. A child safety seat, comprising:

a base, a seat body arranged on the base, two side wings arranged on the seat body, a detachable side impact protection block comprising:

a protection block detachably connected to the child safety seat and protruding from a surface at a connected position in a connected state;

at least one locking member, each of the at least one locking member being arranged between the protection block and the child safety seat for locking and unlocking the protection block on the child safety seat, wherein the detachable side impact protection block is detachably connected to the base or/and at least one of the two said side wings;

wherein the side wing and the base are respectively provided with an accommodating groove, the protection block is detachably connected to the accommodating groove, and the protection block protrudes from a surface of the side wing or the base in the connected state; and a pop-up shielding assembly installed within the accommodating groove and is capable of being protruded from and retracted into the accommodating groove to shield the accommodating groove when the protection block is detached.

18. The child safety seat according to claim 17, wherein a shape of the accommodating groove corresponds to a shape of a connecting end of the detachable side impact protection block, and a depth of the accommodating groove is greater than 1 cm.

19. The child safety seat according to claim 17, further comprising a fixing seat fixed to the side wing or the base, wherein the fixing seat is provided with the accommodating groove and a locking hole communicating with the accommodating groove, and the at least one locking member is detachably engaged with the locking hole.

20. The child safety seat according to claim 19, wherein each one of the two opposite side walls of the accommodating groove is provided with a plurality of said locking holes, and the at least one locking member is engaged with at least one of the locking holes.

21. The child safety seat according to claim 17, wherein the shielding assembly comprises:

a cover slidably connected to the fixing seat, wherein when the protection block is installed in the accommodating groove, the cover is pressed into a bottom of the accommodating groove; and when the protection block is detached, the cover is capable of moving to a top of the accommodating groove to shield the accommodating groove;

a second elastic member accommodated in the accommodating groove and abutting against the cover, the second elastic member permitting the cover to have a tendency of moving towards the top of the accommodating groove.

22. The child safety seat according to claim 21, wherein a side of the cover is provided with a snapping hook slidably snapped in the locking hole.

* * * * *